United States Patent [19]

Takedoi et al.

[11] Patent Number: 4,873,010

[45] Date of Patent: Oct. 10, 1989

[54] SPINDLE-LIKE MAGNETIC IRON OXIDE PARTICLES AND PROCESS FOR PRODUCING THE SAME

[75] Inventors: Atsushi Takedoi; Hiroyuki Kondo; Masaru Isoai; Yoshitaka Yoshinaga; Tosiharu Harada; Yosiro Okuda; Hiroshi Sumita; Hirofumi Kawasaki; Kohji Mori, all of Hiroshima, Japan

[73] Assignee: Toda Kogyo Corp., Hiroshima, Japan

[21] Appl. No.: 39,775

[22] Filed: Apr. 15, 1987

Related U.S. Application Data

[63] Continuation of Ser. No. 724,161, Apr. 17, 1985, abandoned.

[30] Foreign Application Priority Data

Apr. 28, 1984 [JP] Japan ............................. 59-87011
Jun. 30, 1984 [JP] Japan ............................ 59-136341
Mar. 2, 1985 [JP] Japan ............................. 60-42387

[51] Int. Cl.$^4$ ........................................... C04B 35/26
[52] U.S. Cl. .................................................. 252/62.59
[58] Field of Search ............... 423/632; 252/62.56, 252/62.59

[56] References Cited

U.S. PATENT DOCUMENTS

| | | | |
|---|---|---|---|
| 3,931,007 | 1/1976 | Sugano et al. | 423/632 |
| 3,947,502 | 3/1976 | Leitner et al. | 423/632 |
| 3,977,985 | 8/1976 | Umeki et al. | 252/62.55 |
| 4,136,158 | 1/1979 | Okuda et al. | 423/632 |
| 4,376,714 | 3/1983 | Pingaud | 423/632 |
| 4,520,069 | 5/1985 | Kitamoto et al. | 428/328 |

FOREIGN PATENT DOCUMENTS

| | | |
|---|---|---|
| 3017524 | 11/1980 | Fed. Rep. of Germany . |
| 3017525 | 11/1980 | Fed. Rep. of Germany . |
| 3017526 | 11/1980 | Fed. Rep. of Germany . |
| 48-87397 | 11/1973 | Japan ............... 252/62.55 |
| 50-80999 | 1/1975 | Japan . |
| 52-24237 | 6/1977 | Japan . |
| 52-24238 | 6/1977 | Japan . |
| 52-36751 | 9/1977 | Japan . |
| 52-36863 | 9/1977 | Japan . |
| 183626 | 12/1982 | Japan . |
| 57-18362 | 6/1983 | Japan ............... 252/62.54 |
| 161706 | 9/1983 | Japan ............... 252/62.56 |

OTHER PUBLICATIONS

Chemical Abstracts (CA): 90010u.
CA: 90011v.
CA: 201270a.
CA: 25215e.
CA: 38021p.

Primary Examiner—John Doll
Assistant Examiner—Jeffrey Edwin Russel
Attorney, Agent, or Firm—Oblon, Fisher, Spivak, McClelland & Maier

[57] ABSTRACT

Disclosed herein are magnetic iron oxide particles comprising spindle-like magnetite or maghemite particles having an aspect ratio(major:minor) of less than 4:1 and containing 0.1 to 20 atomic % of Si to Fe, and a process for producing the same.

20 Claims, 17 Drawing Sheets

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(×20000)

(x 20000)

(x 20000)

SPINDLE-LIKE MAGNETIC IRON OXIDE PARTICLES AND PROCESS FOR PRODUCING THE SAME

This application is a continuation, of application Ser. No. 06/724,161, filed Apr. 17, 1985, now abandoned.

BACKGROUND OF THE INVENTION

The present invention relates to magnetic iron oxide particles for magnetic recording, particularly to magnetic iron oxide particles comprising spindle-like magnetite or maghemite particles which are most suitable as the magnetic iron oxide particles for use in rigid disk recording, floppy disk recording and digital recording, uniform in particle size and shape, not contaminated by dendrites and have the small aspect ratio (major:minor) of less than 4:1, particularly 2:1, and a process for producing the magnetic iron oxide particles.

Recently, with the progress of long-time recording, miniaturizing and weight-saving of the reproducing apparatus for magnetic recording, the demands for the magnetic recording reproducing apparatus and the magnetic recording media such as magnetic tape, magnetic disks, etc., with higher performance and higher recording density has been intensified.

The fact is recognized from the following description in "Development of the magnetic materials and the technique for highly dispersing of the magnetic particles" published by SOGO-GIJUTSU-CENTER (1982) page 134. "The technical improvement which has been pursued up to now since the appearance of magnetic disk apparatus concerns the high recording density, and the high recording density has been rapidly raised as high as more than two figures within about 20 years in spite of the use of magnetic iron oxide particles of maghemite ($\gamma$-$Fe_2O_3$), as the magnetic material. The high recording density depends on, in addition to the improvement of $\gamma$-$Fe_2O_3$ particles, making the coating medium thin, the precision of the surface of the thus coated thin medium, the adoption of the technique of orienting the magnetic field, the avoidance of the floating-up of the head and the improvement of the specific characters of the head."

In order to form the magnetic recording medium with high performance and higher recording density, it is necessary to improve the dispersibility in the vehicle, loading in a coating medium, residual magnetic flux density (Br) and the smoothness of the surface of the magnetic tape, and to prepare the coating medium as thin as possible.

These facts are recognized from the following in "Development of the magnetic materials and the technique for highly dispersing magnetic particles", in page 140, "In the high recording density, it is necessary to increase the residual magnetic flux density (Br) for securing a predetermined output. In order to increase the residual magnetic flux density (Br), the orientation of the magnetic powder into the direction of the magnetic field must be increased and the degree of loading of the magnetic particles must be high." in page 141 of the same publication, "In order to obtain a high recording density, it is the most important factor to make the coating medium thin" in page 143 of the same publication, "The amount of floating-up of the head in the case of the head floating-up type such as in the rigid disk device is the major factor of the high recording density, and such a high recording density is possible by decreasing the spacing between the head and the recording medium. However,—in the case of the surface roughness not small enough, the reduction of the output signal occurs and it causes the headcrush due to the chipping of the head. Accordingly,—it is necessary to carry out the finishing of the surface of the coating medium as smooth as possible."

The specific properties of the medium for magnetic recording are close relationship to the magnetic iron oxide particles used for producing the magnetic media, and accordingly, the improvement in the specific properties of the magnetic iron oxide particles has been strongly demanded.

The relationship between the specific properties of the magnetic recording media and properties of the magnetic iron oxide particles used therefor are described more in detail as follows.

First of all, the residual magnetic flux density (Br) of the magnetic recording media depends on the dispersibility of the magnetic iron oxide particles in the vehicle, and orientation and loading of the magnetic iron oxide particles in the coating medium.

In order to improve the dispersibility in the vehicle and the orientation and the loading in the coating medium of the magnetic iron oxide particles, it is demanded that the particles to be dispersed in the vehicle are uniform in size and shape thereof and the particles are not contaminated by the dendrites and as a result, that the particles have large apparent density.

In the next place, in order to improve the surface properties of the magnetic recording media it is demanded that the magnetic iron oxide particles are excellent in the dispersibility and the orientation of the particles and the particle size is small enough, and as such magnetic iron oxide particles it is required that the particles are uniform in size and shape thereof and not contaminated by dendrites and as a result, that the particles have large apparent density.

In order to have the magnetic media of high performance and suitable for obtaining the high recording density, it is necessary that the coercive force of the media is as high as possible and is distributed in narrow range, and for that purpose, the coercive force (Hc) of the magnetic particles to be dispersed in the vehicle should be as high as possible and distributed in a narrow range.

Furthermore, in order to make the magnetic recording media as thin as possible, as is clearly seen in the following description of the above-mentioned reference, page 141 "For making the magnetic recording media as thin as possible, it is necessary to make the size of the magnetic iron oxide particle as small as possible and to give the excellent orientability in the coating medium. Formation of a thin coating medium is related to make a magnetic paint which is excellent in applicability by using the magnetic iron oxide particles with small oil absorption."

Those magnetic iron oxide particles of good dispersibility and orientability are favorable for that purpose, and as those magnetic iron oxide particles, those uniform in particle size and shape, and not contaminated by the dendrites are demanded.

On the other hand, one of the methods for forming the magnetic recording media with high recording density in the reproducing apparatus for magnetic recording is to narrow the width of magnetic head gap. This fact is clearly seen in the following description of the above-mentioned reference, page 15, "The important index representing the performance of the medium for magnetic recording is . . . the recording density. The improvement of the recording density has been carried out by improving the magnetic head and the recording medium.

The improvements which have been carried out in this field are mainly directed to realizing the magnetic head, the narrow width of the gap and the narrow width of the truck—."

The recording principle of the recording medium and the magnetic head in the longitudinal recording method (the method for recording a signal in the longitudinal direction of the magnetic layer) is the same as the following description in the above-mentioned reference, page 18, "In the ring head (FIG. 2a), a circular arc-like magnetic field is formed in the vicinity of the gap of the magnet center by the signal current of a coil. Since the magnetic field has a strong longitudinal component in the center of the gap, the medium is magnetized mainly in the longitudinal (within the plane) direction."

Although, for aiming the high recording density there is a tendency of narrowing the width of the gap of the magnetic head more and more in recent years, in such a case of narrowing the width of the gap of the magnetic head, the magnetic field in the vicinity of the gap in the magnetic center becomes to include the strong perpendicular component together with the longitudinal component. Accordingly, in the surface layer of the magnetic recording medium, which is in contact with the magnetic head, the width of distribution of the magnetic flux perpendicular to the medium becomes remarkably larger.

Consequently, in order to have a high recording density, it is preferable to make the medium having a direction of easy magnetization perpendicular to the medium within the magnetic recording medium.

As the representative magnetic particles hitherto, acicular magnetite particles or acicular maghemite particles are used, and in such cases, since the direction of easy magnetization is the longitudinal direction of the acicular particles due to the form anisotropy thereof, it is preferable to increase the perpendicular component by orienting the acicular magnetic iron oxide particles perpendicular in the coating medium or orienting thereof in random tridimensionally.

This fact is clearly seen from the following descriptions in Japanese Patent Application Laying-Open No. 57-183626(1982), "In addition, according to the introduction of perpendicular magnetic recording in recent years, there is a proposal of effectively using the residual magnetization component in the direction perpendicular to the surface of the magnetic recording medium. By the perpendicular magnetic recording, the recording density defined above becomes higher, and "In magnetic layer of the coating medium, . . . use of the magnetization component perpendicular or oblique (not parallel) to the magnetic surface . . . ".

In order to orient the magnetic iron oxide particles at random tridimensionally in the coating medium, thereby increasing the perpendicular magnetization component, it is effective that in addition to use of the particles uniform in particle size and shape, and not contaminated by the dendrites, the size of the magnetic iron oxide particles is reduced and the aspect ratio (major:minor) of the particle is reduced as possible to less than 4:1, particularly to less than 2:1, in other words, the particles show the shape magnetic isotropy and the magneto crystalline isotropy.

The just-mentioned fact is clearly seen from the following description in the above-mentioned Japanese Patent Application Laying-Open No. 57-183626/1982, "The present invention is characterized by the use of the particles of a small size of less than 0.30 $\mu$m and . . . of the ratio of longitudinal length to transverse length of over one and below 3 in place of the conventionally used acicular particles having the major axis of 0.4 to 2 $\mu$m or 0.3 to 1 $\mu$m and the ratio of longitudinal length to transverse length of 5 to 20, . . . thereby suppressing the tendency of the particles in orienting within the coating medium due to the reduction of the thickness of the coating medium in the case of coating and drying or due to the flow of the coating material in the direction of the flow, and if necessary, allowing the increase of the perpendicular component of the residual magnetization positively."

At present, as the magnetic particles for magnetic recording, mainly the acicular magnetite or maghemite particles are in use. The acicular magnetic particles are obtained by the steps of reacting an aqueous solution of a ferrous salt with an alkali to obtain an aqueous solution containing colloidal particles of ferrous hydroxide, oxidizing the thus obtained colloidal solution showing a pH of higher than 11 by air (generally called as the wet process) to obtain the acicular ($\alpha$-FeOOH) particles and reducing the $\alpha$-FeOOH particles in a reductive gas such as hydrogen at 300° to 400° C. The thus obtained acicular magnetite particles are oxidized in air at 200° to 300° C. to obtain the acicular maghemite particles.

As has been described above, the magnetic particles which are uniform in particle size and shape, are not contaminated by the dendrites and have a small aspect ratio (major axis:minor axis) are those demanded most keenly at present, and in order to obtain the magnetic particles provided with such specific properties, it is necessary that the $\alpha$-FeOOH particles (hereinafter referred to as "goethite particles") used as the starting material are uniform in particle size and shape, are not contaminated by the dendrites and have a small aspect ratio (major axis:minor axis).

Hitherto, the most representative and known process for producing the goethite particles in an alkali region of higher than pH 11 comprises the steps of adding an aqueous alkali solution in an amount of more than equivalent to an aqueous solution of a ferrous salt to obtain a solution containing the ferrous hydroxide particles and oxidizing the thus obtained solution at a temperature of lower than 80° C.

The thus obtained goethite particles—exhibit the acicular form of an aspect ratio(major axis:minor axis) of larger than 10:1 and are contaminated by the dendrites, and from the viewpoint of their particle size, are not uniform in particle size.

By the way, as well known, the coercive force of the magnetic particles depends on the shape anisotropy, crystal anisotropy, strain anisotropy or exchange anisotropy, or on the mutual interaction of them. At present, the acicular magnetite particles or acicular maghemite particles are provided with a relatively high coercive force of 350 to 450 Oe by utilizing their anisotropy derived from their shape.

Though, the known acicular magnetite or maghemite particles have a relatively high coercive force, the coercive force thereof is further increased by incorporating cobalt to these particles while utilizing the crystal anisotropy due to cobalt. Further, it has been known that the coercive force of the particles is more increased as the amount of incorporated cobalt is larger.

As has been stated, those magnetic particles which are uniform in particle size and shape, not contaminated by the dendrites and small in the aspect ratio (major axis:minor axis) thereof are those demanded most keenly at present. However, the magnetic particles obtained from the acicular goethite particles as the starting material, which have been prepared by the above-mentioned known method are the acicular particles of the aspect ratio (major axis:minor axis) of larger than 10:1, contaminated by the dendrites and not uniform in size and shape.

On the other hand, the present inventors have obtained the information concerning the goethite particles used as the starting material for producing the magnetic particles for magnetic recording, particularly for rigid disk recording, floppy disk recording and digital recording. Namely, it is necessary that those goethite particles are uniform in particle size and shape, not contaminated by the dendrites and the aspect ratio of the particles is as small as possible, for example less than 4:1, particularly less than 2:1.

Then, the present inventors have noticed a process for producing the goethite particles by reacting an aqueous solution of a ferrous salt and an aqueous solution of alkali carbonate to obtain an aqueous solution containing $FeCO_3$ and oxidizing $FeCO_3$ in the aqueous solution by blowing an oxygen containing gas into the thus obtained aqueous solution, (refer to Japanese Patent Application Laying-Open No. 50-80999(1975)).

In this process, the thus obtained goethite particles are uniform in particle size and shape, and not contaminated by the dendrites and show the spindle-like shape.

However, since the aspect ratio (major axis:minor axis) of the thus obtained goethite particles is about 7:1, and it is demanded to reduce the aspect ratio of the particle.

On the other hand, in the case where the aspect ratio (major axis:minor axis) of the magnetic iron oxide particles is small, the coercive force of the thus produced magnetic iron oxide particles is lower than about 300 Oe because the anisotropy derived from the shape thereof does not act.

In addition, it has been known that the coercive force of the magnetic iron oxide particles of a small aspect ratio (major axis:minor axis) can be increased by the incorporation of cobalt thereinto, and in such a case, the thus obtained particles show not only the shape magnetic isotropy but also the magneto crystalline isotropy, namely the magnetic iron oxide particles for magnetic recording which are most keenly demanded.

However, it has been known that the magnetic iron oxide particles containing Co are poor in magnetic stability to the ambient temperature (particularly, the stability of the coercive force thereof to the temperature, hereinafter referred to as the "thermo-stability"), and there is a tendency that in the case where the content of cobalt is larger, the thermostability is poorer.

Concerning the instability of the magnetic iron oxide particles containing Co to the ambient temperature, for instance, FIG. 3 of Japanese Patent Application Laying-Open No. 48-87397 (1973) shows the situation thereof wherein a tendency of the reduction of coercive force of the magnetic iron oxide particles containing Co with the raise of the temperature thereof is indicated. More in detail, according to FIG. 3, the coercive force of the maghemite ($\gamma$-$Fe_2O_3$) particles containing Co is reduced from about 678 Oe at 25° C. to about 420 Oe at 120° C., thus showing a reduction of as high as 258 Oe.

Also in the case of the magnetite($Fe_3O_4$) particles containing Co, the coercive force thereof is reduced from about 572 Oe at 25° C. to about 341 Oe at 120° C., thus showing the reduction of as high as 231 Oe.

In addition, it has been known that the coercive force of the magnetic iron oxide particles is increased by coating the magnetic iron oxide particles by cobalt.

However, there is a demerit that the magnetic iron oxide particles coated by cobalt has a broader distribution of the coercive force than the particles not containing Co. This phenomenon is considered to be due, in the case where the particles are seen microscopically, to the different amount of cobalt between the particles and the fluctuation of the composition of cobalt even on the surface of each particle.

Accordingly, as a result of studying the process for producing the above-mentioned spindle-like goethite particles, which are uniform in particle size and shape, not contaminated by dendrites and have the aspect ratio (major axis:minor axis) of as small as possible, for example, of less than 4:1, particularly less than 2:1, the present inventors have obtained the following finding.

In the case where an aqueous solution of a ferrous salt is reacted with an alkali carbonate to obtain an aqueous solution containing $FeCO_3$ and the thus obtained $FeCO_3$ in the aqueous solution is oxidized by blowing an oxygen-containing gas into the aqueous solution containing $FeCO_3$, by adding a water-soluble silicate in an amount of 0.1 to 20 atomic % (calculated as Si) to Fe (of the ferrous salt) into the aqueous solution of the ferrous salt, into the aqueous solution of alkali carbonate or into the aqueous solution containing the $FeCO_3$ before blowing the oxygen-containing gas thereinto for oxidation thereof, the aspect ratio (major axis:minor axis) of the spindle-like goethite particles can become smaller, for example, less than 4:1, particularly less than 2:1, as compared to that in the case where the silicate is not added.

In addition, as a result of further studying of the process for producing the magnetic iron oxide particles showing a high coercive force and an excellent thermo-stability, the present inventors have obtained the following completely novel finding.

Namely, in the case where both the silicate and cobalt are added in the production of the spindle-like goethite particles as the starting material, the spindle-like magnetic iron oxide particles containing Si and Co which are obtained by reducing the goethite particles or reducing and oxidizing the goethite particles show the shape magnetic isotropy and the magneto crystalline isotropy thereof, and have a high coercive force together with an excellent thermo-stability.

Furthermore, as a result of further studying the process for producing the magnetic iron oxide particles showing a narrow distribution of the coercive force in addition to the high coercive force, the present inventors have obtained the following novel finding.

Namely, in the case where the spindle-like goethite particles containing Si are used as the starting material, spindle-like goethite particles containing Si are reduced or reduced and oxidized, thereby obtaining the spindle-like magnetic iron oxide particles containing Si and the thus obtained spindle-like magnetic iron oxide particles containing Si are coated by cobalt, the thus obtained coated particles have a high coercive force and in the same time, show a narrow distribution of the coercive force.

The present invention has been attained on the basis of the above-mentioned findings.

SUMMARY OF THE INVENTION

In a first aspect of the present invention, there is provided magnetic iron oxide particles comprising spindle-like magnetite or maghemite particles having an aspect ratio (major axis:minor axis) of less than 4:1 and containing 0.1 to 20 atomic % of Si to Fe.

In a second aspect of the present invention, there is provided magnetic iron oxide particles comprising spindle-like magnetite or maghemite particles having an aspect ratio (major axis:minor axis) of less than 4:1 and containing 0.1 to 20 atomic % of Si to Fe and 0.5 to 10.0 atomic % of Co to Fe, and showing excellent in the thermo-stability.

In a third aspect of the present invention, there is provided magnetic iron oxide particles comprising spindle-like magnetite or maghemite particles having an aspect ratio (major axis:minor axis) of less than 4:1, containing 0.1 to 20 atomic % of Si to Fe, having the surface of the spindle-like magnetite or maghemite particles, coated by 0.5 to 15 atomic % of Co to Fe and a coercive force distribution of less than 1.5 in S.F.D.

In a fourth aspect of the present invention, there is provided a process for producing magnetic iron oxide particles comprising spindle-like magnetite or maghemite particles, the process comprising the steps of:

oxidizing $FeCO_3$ in an aqueous suspension by blowing an oxygen-containing gas into the aqueous suspension containing $FeCO_3$ obtained by reacting an aqueous solution of a ferrous salt with an aqueous solution of alkali carbonate, wherein a water-soluble silicate is added into said aqueous solution of alkali carbonate, into the aqueous solution of a ferrous salt or into the aqueous suspension containing $FeCO_3$ before blowing the oxygen-containing gas thereinto in an amount of 0.1 to 20 atomic % (calculated as Si) to Fe (of the ferrous salt), thereby obtaining spindle-like goethite particles containing Si, containing Si or the spindle-like hematite particles containing Si obtained by thermally dehydrating the spindle-like goethite particles containing Si to thermal reduction in a reducing gas, and optionally oxidizing the thus obtained spindle-like magnetite particles.

In a fifth aspect of the present invention, there is provided a process for producing magnetic iron oxide particles comprising spindle-like magnetite or maghemite particles, the process comprising the steps of:

oxidizing $FeCO_3$ in an aqueous suspension by blowing an oxygen-containing gas into the aqueous suspension containing $FeCO_3$ obtained by reacting an aqueous solution of a ferrous salt with an aqueous solution of alkali carbonate, wherein a water-soluble silicate and water-soluble cobalt salt are added into said aqueous solution of alkali carbonate, into the aqueous solution of a ferrous salt or into the aqueous suspension containing $FeCO_3$ before blowing the oxygen-containing gas thereinto in an amount of 0.1 to 20 atomic % (calculated as Si) to Fe (of the ferrous salt), and 0.5 to 10 atomic % (calculated as Co) to Fe (of the ferrous salt), respectively, thereby obtaining spindle-like goethite particles containing Si and Co, subjecting the thus obtained spindle-like goethite particles containing Si and Co or the spindle-like hematite particles containing Si and Co obtained by thermally dehydrating the spindle-like goethite particles containing Si and Co to thermal reduction in a reducing gas, and optionally oxidizing the thus obtained spindle-like magnetite particles.

In the sixth aspect of the present invention, there is provided a process for producing magnetic iron oxide particles comprising spindle-like magnetite or maghemite particles, the process comprising the steps of:

oxidizing $FeCO_3$ in an aqueous suspension by blowing an oxygen-containing gas into the aqueous suspension containing $FeCO_3$ obtained by reacting an aqueous solution of a ferrous salt with an aqueous solution of alkali carbonate, wherein a water-soluble silicate is added into said aqueous solution of alkali carbonate, into the aqueous solution of a ferrous salt or into the aqueous suspension containing $FeCO_3$ before blowing the oxygen-containing gas thereinto in an amount of 0.1 to 20 atomic % (calculated as Si) to Fe (of the ferrous salt), thereby obtaining spindle-like goethite particles containing Si, subjecting the thus obtained spindle-like goethite particles containing Si or the spindle-like hematite particles containing Si obtained by thermally dehydrating the spindle-like goethite particles containing Si to thermal reduction in a reducing gas, optionally oxidizing the thus obtained spindle-like magnetite particles, dispersing the thus obtained spindle-like magnetite or maghemite particles in an aqueous alkaline suspension of cobalt hydroxide or both cobalt hydroxide and ferrous hydroxide and subjecting the resultant aqueous suspension to thermal treatment at 50° to 100° C. in a non-oxidative atmosphere, thereby obtaining the spindle-like magnetite or maghemite particles whose the surface is coated by 0.5 to 15 atomic % of Co to Fe.

BRIEF DESCRIPTION OF THE DRAWINGS

Of the attached drawings, FIGS. 11 to 34 are the electron microscope photographs of the particles.

Figure 11:
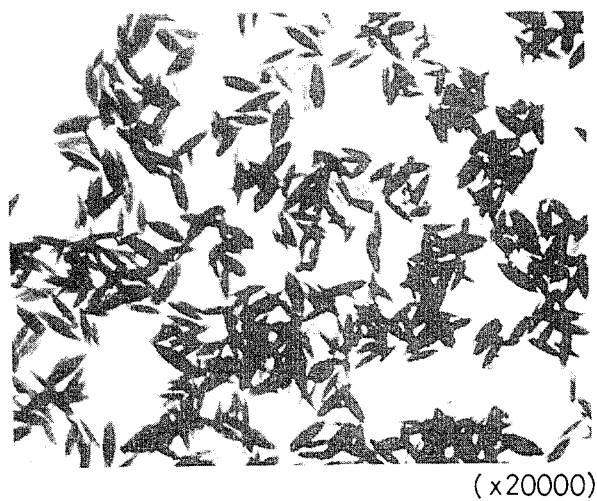
Figure 12:
Figure 13:
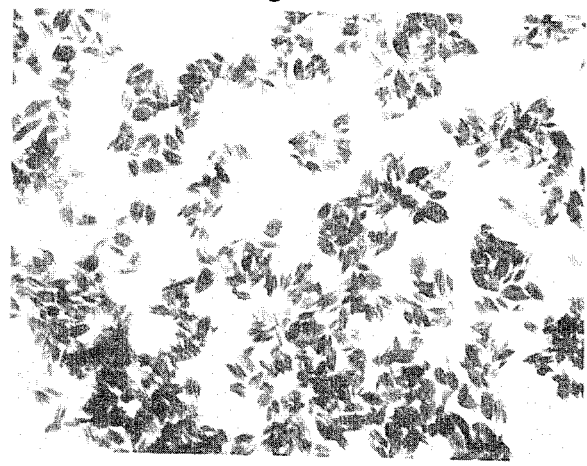
Figure 14:
Figure 15:
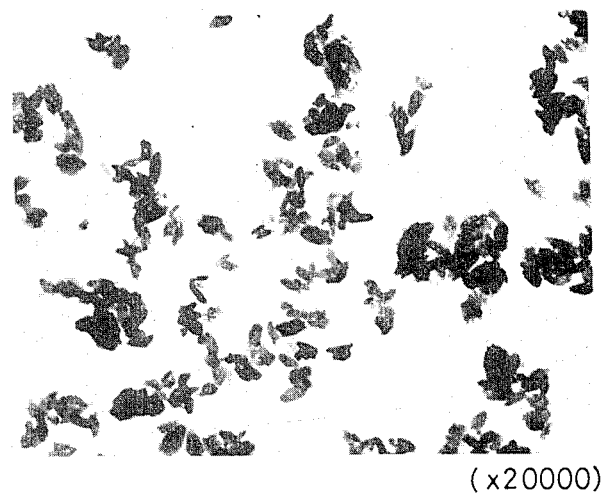
Figure 16:
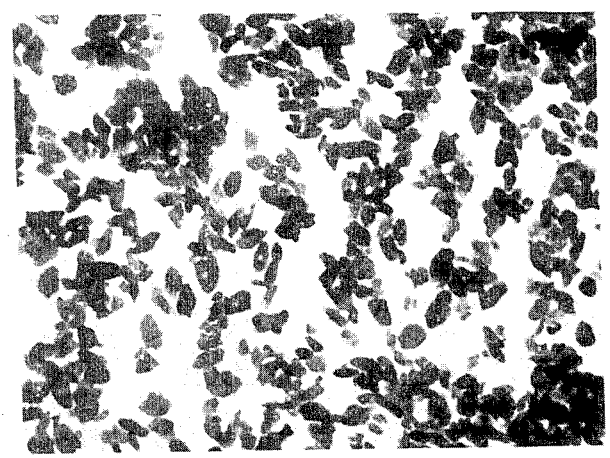
Figure 17:
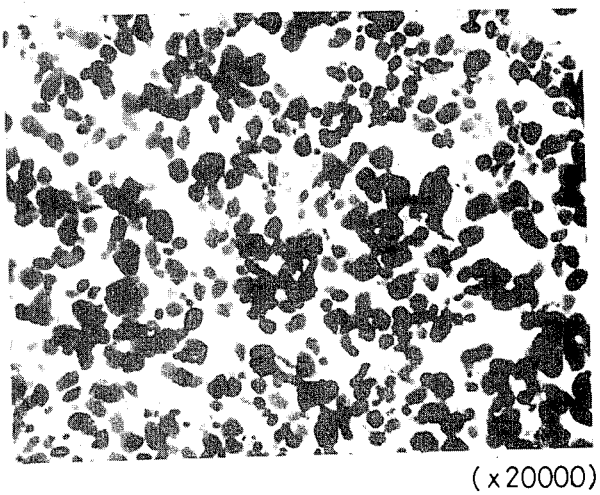
Figure 18:
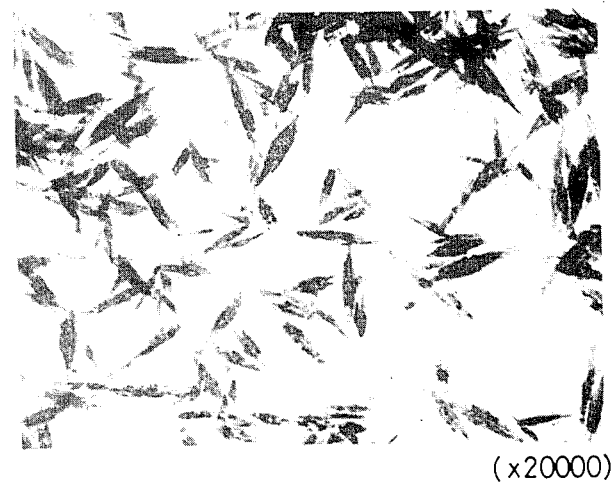
Figure 19:
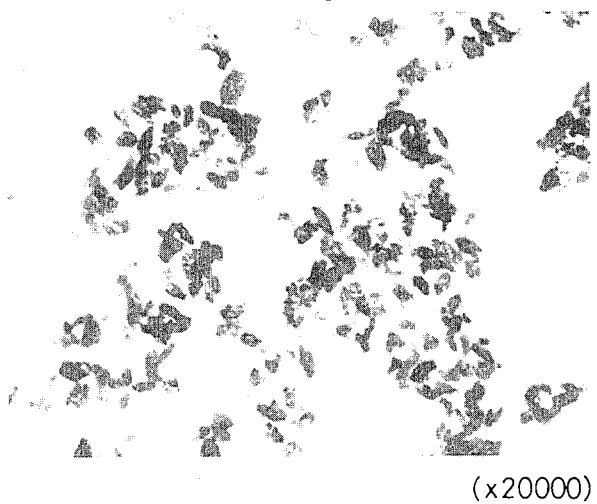
Figure 20:
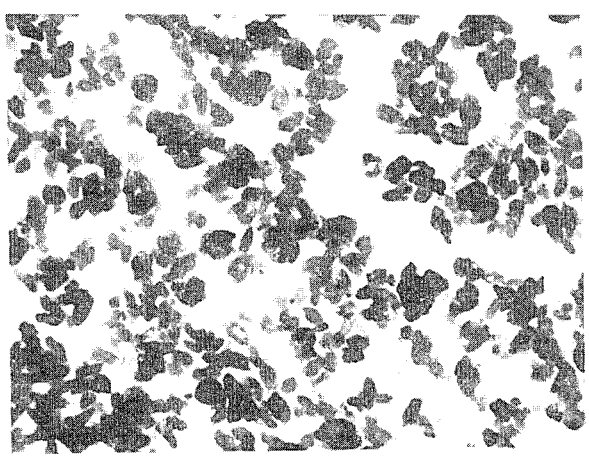
Figure 21:
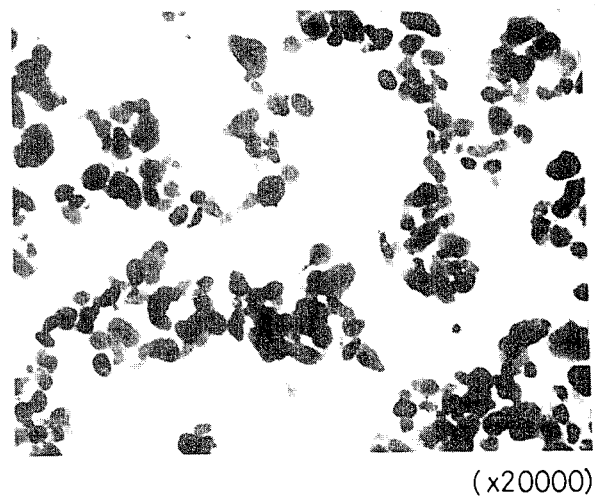
Figure 22:
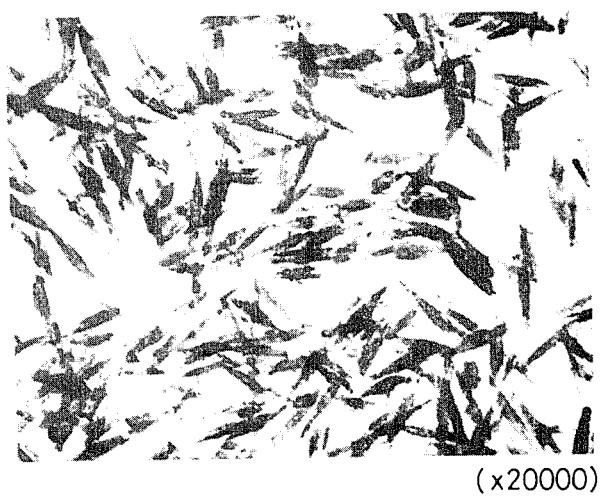

Namely, FIGS. 11 to 13 are the electron microscope photographs of the spindle-like goethite particles containing Si, respectively obtained in Examples 1, 3 and 5; FIG. 14 is the electron microscope photograph of the spindle-like goethite particles obtained in Comparative Example 1; FIGS. 15 to 17 are the electron microscope photographs of the spindle-like magnetite particles containing Si, respectively obtained in Examples 14, 16 and 18; FIG. 18 is the electron microscope photograph of the spindle-like magnetite particles obtained in Comparative Example 2; FIGS. 19 to 21 are electron microscope photographs of the spindle-like maghemite particles containing Si, respectively obtained in Examples 27, 29 and 31 and FIG. 22 is electron microscope photograph of the spindle-like maghemite particles obtained in Comparative Example 3.

Figure 23:
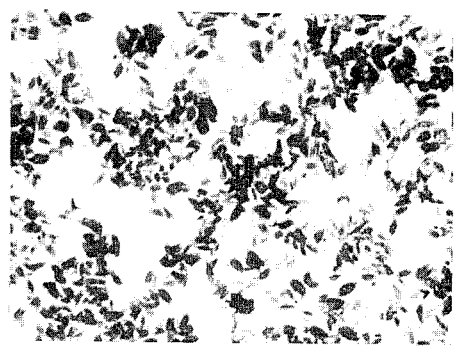
Figure 24:
Figure 25:
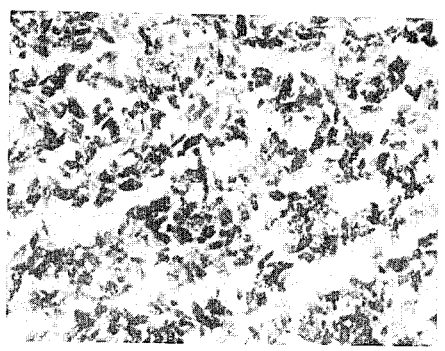
Figure 26:
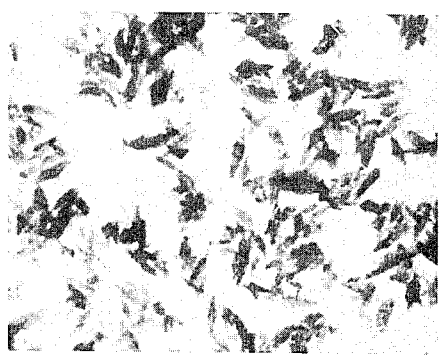
Figure 27:
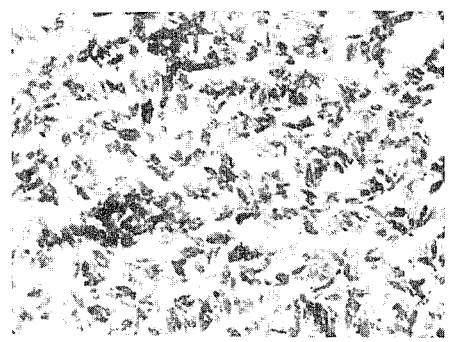
Figure 28:
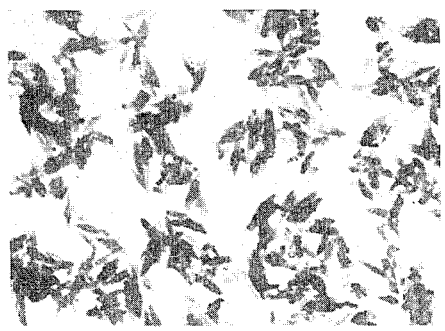
Figure 29:
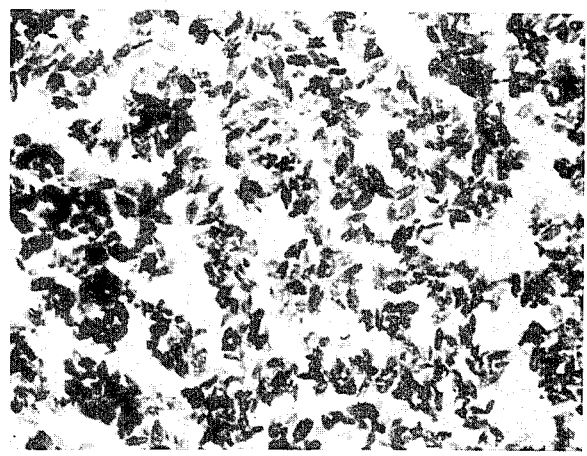
Figure 30:
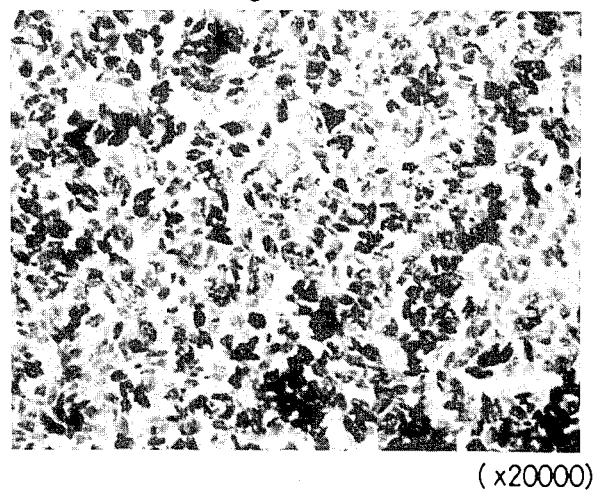
Figure 31:
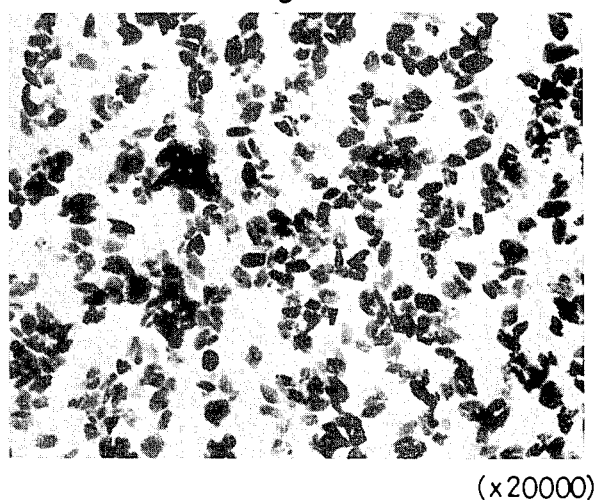
Figure 32:
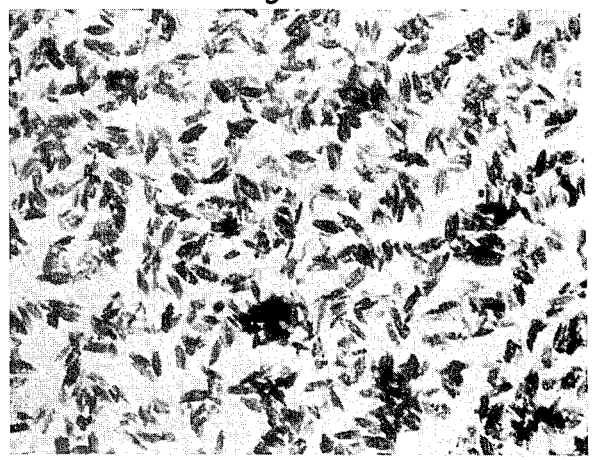
Figure 33:
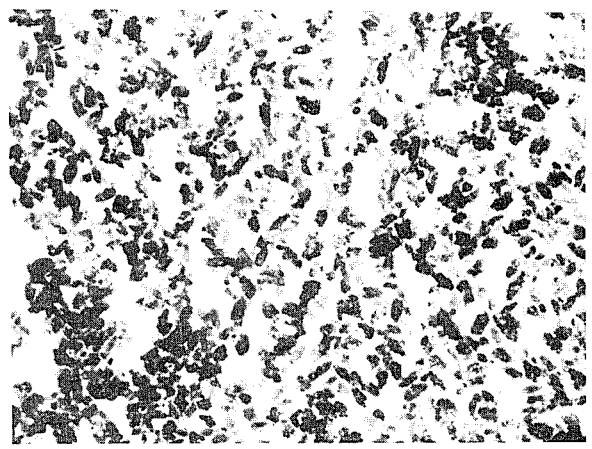
Figure 34:
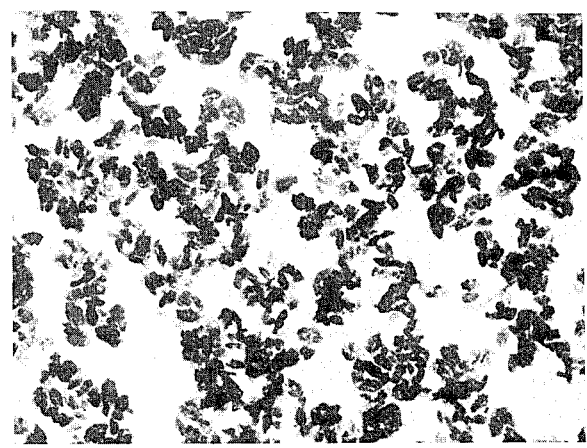

FIGS. 23 and 24 are the electron microscope photographs of the spindle-like goethite particles containing Si and Co, respectively obtained in Examples 40 and 43; FIGS. 25 and 26 are the electron microscope photographs of the spindle-like magnetite particles containing Si and Co, respectively obtained in Examples 50 and 53; FIGS. 27 and 28 are the electron microscope photographs of the spindle-like maghemite particles containing Si and Co obtained, respectively in Examples 60 and 63; FIGS. 29 to 31 are the electron microscope photographs of the spindle-like magnetite particles containing Si, coated by Co and $Fe_2^+$ which were obtained, respectively in Examples 82, 86 and 81 and FIGS. 32 to 34 are the electron microscope photographs of the spindle-like maghemite particles containing Si, coated by Co and $Fe^{2+}$ which were obtained, respectively in Examples 87, 88 and 91.

DETAILED DESCRIPTION OF THE INVENTION

The present invention relates to magnetic iron oxide particles for use in magnetic recording, comprising spindle-like magnetite or maghemite particles having an aspect ratio (major axis:minor axis) of less than 4:1 and containing 0.1 to 20 atomic % of Si to Fe, and to a process for producing magnetic iron oxide particles comprising the spindle-like magnetite or maghemite particles, the process comprising the steps of:

oxidizing $FeCO_3$ in an aqueous suspension by blowing an oxygen-containing gas into the aqueous suspension containing $FeCO_3$ obtained by reacting an aqueous solution of a ferrous salt with an aqueous solution of alkali carbonate, wherein a water-soluble silicate is added into said aqueous solution of alkali carbonate, into the aqueous solution of a ferrous salt or into the aqueous suspension containing $FeCO_3$ before blowing the oxygen-containing gas thereinto in an amount of 0.1 to 20 atomic % (calculated as Si) to Fe (of the ferrous salt), thereby obtaining spindle-like goethite particles containing Si, subjecting the thus obtained spindle-like goethite particles containing Si or the spindle-like hematite particles containing Si obtained by thermally dehydrating the spindle-like goethite particles containing Si to thermal reduction in a reducing gas, and optionally oxidizing the thus obtained spindle-like magnetite particles.

Further, the present invention relates to magnetic iron oxide particles for use in magnetic recording, comprising spindle-like magnetite or maghemite particles having an aspect ratio (major axis:minor axis) of less than 4:1, containing 0.1 to 20 atomic % of Si to Fe and 0.5 to 10.0 atomic % of Co to Fe and showing an excellent thermo-stability and to a process for producing magnetic iron oxide particles comprising spindle-like magnetite or maghemite particles, the process comprising the steps of:

oxidizing $FeCO_3$ in an aqueous suspension by blowing an oxygen-containing gas into the aqueous suspension containing $FeCO_3$ obtained by reacting an aqueous solution of a ferrous salt with an aqueous solution of alkali carbonate, wherein a water-soluble silicate and water-soluble cobalt salt are added into said aqueous solution of alkali carbonate, into the aqueous solution of a ferrous salt or into the aqueous suspension containing $FeCO_3$ before blowing the oxygen-containing gas thereinto in an amount of 0.1 to 20 atomic % (calculated as Si) to Fe (of the ferrous salt) and 0.5 to 10 atomic % (calculated as Co) to Fe (of the ferrous salt), respectively, thereby obtaining spindle-like goethite particles containing Si and Co, subjecting the thus obtained spindle-like goethite particles containing Si and Co or the spindle-like hematite particles containing Si and Co obtained by thermally dehydrating the spindle-like goethite particles containing Si and Co to thermal reduction in a reducing gas, and optionally oxidizing the thus obtained spindle-like magnetite particles.

Also, the present invention relates to magnetic iron oxide particles for use in magnetic recording, comprising spindle-like magnetite or maghemite particles having an aspect ratio (major axis:minor axis) of less than 4:1, containing 0.1 to 20 atomic % of Si to Fe, and having the surface thereof coated by 0.5 to 15.0 atomic % of Co to Fe therein and a distribution of coercive force of less than 1.5 of S.F.D. and a process for producing magnetic iron oxide particles comprising spindle-like magnetite or maghemite particles, the process comprising the steps of:

oxidizing $FeCO_3$ in an aqueous suspension by blowing an oxygen-containing gas into the aqueous suspension containing $FeCO_3$ obtained by reacting an aqueous solution of a ferrous salt with an aqueous solution of alkali carbonate, wherein a water-soluble silicate is added into said aqueous solution of alkali carbonate, into the aqueous solution of a ferrous salt or into the aqueous suspension containing $FeCO_3$ before blowing the oxygen-containing gas thereinto in an amount of 0.1 to 20 atomic % (calculated as Si) to Fe (of the ferrous salt), thereby obtaining spindle-like goethite particles containing Si, subjecting the thus obtained spindle-like goethite particles containing Si or the spindle-like hematite particles containing Si obtained by thermally dehydrating the spindle-like goethite particles containing Si to thermal reduction in a reducing gas, optionally oxidizing the thus obtained spindle-like magnetite particles, dispersing the thus obtained spindle-like magnetite or maghemite particles in an aqueous alkaline suspension of cobalt hydroxide or both cobalt hydroxide and ferrous hydroxide and subjecting the resultant aqueous suspension to thermal treatment at 50° to 100° C. in a non-oxidative atmosphere, thereby obtaining the spindle-like magnetite or maghemite particles whose the surface is coated by 0.5 to 15 atomic % of Co to Fe.

The present invention will be explained while drawing a part of a number of Examples carried out by the present inventors as follows.

Figure 1:
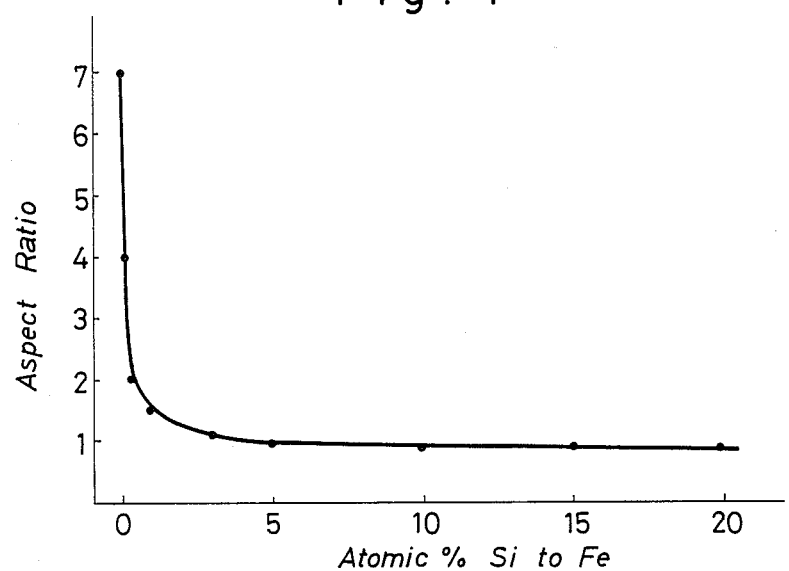
FIG. 1 shows the relationship between the aspect ratio of the goethite particles containing Si and the amount of the water-soluble silicate.

FIG. 1 shows the relationship between the aspect ratio of the spindle-like goethite particles containing Si and the amount of the water-soluble silicate.

Namely, into 2.0 liters of an aqueous solution of sodium carbonate obtained by adding sodium silicate in an amount of 0 to 20 atomic % (calculated as Si) to Fe (of ferrous sulfate) 3.0 liters of an aqueous solution of ferrous sulfate containing 1.0 mol of $Fe^{2+}$ per liter were added, thereby obtaining an aqueous suspension of $FeCO_3$ (about pH 10) and air was blown into the thus obtained aqueous suspension at a rate of 15 liters/min at a temperature of 50° C. to oxidize $FeCO_3$ in the aqueous suspension, thereby obtaining spindle-like goethite particles.

As are clearly seen in FIG. 1, there is a tendency of reduction of the aspect ratio (major axis:minor axis) of the particle with the increase of the amount of addition of the water-soluble silicate.

Figure 2:
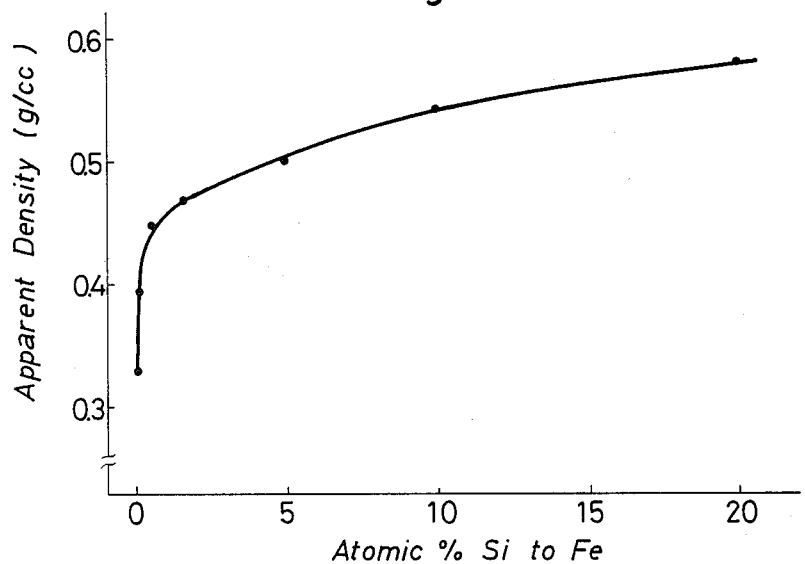
FIG. 2 shows the relationship between the apparent density of the goethite particles containing Si and the amount of the water-soluble silicate.

FIG. 2 shows the relationship between the apparent density of the spindle-like goethite particles and the amount of addition of the water-soluble silicate.

As are clearly seen in FIG. 2, there is a tendency of increase of the apparent density of the particle with the increase of the amount of addition of the water-soluble silicate.

Figure 3:
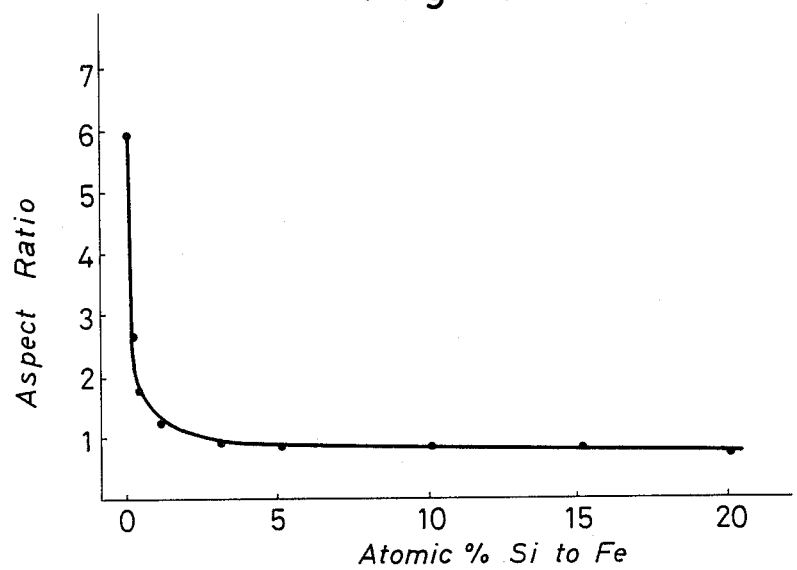
FIG. 3 shows the relationship between the aspect ratio of the magnetic iron oxide particles comprising the spindle-like magnetite particles containing Si and the amount of the water-soluble silicate.
Figure 4:
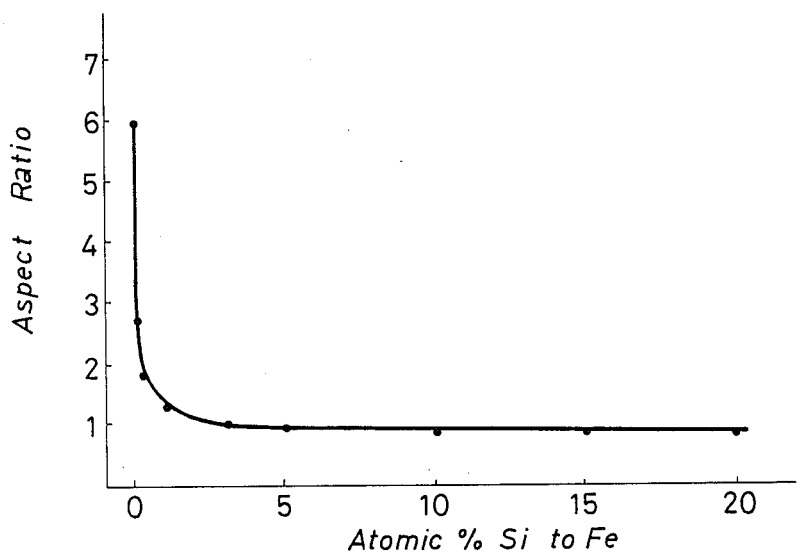
FIG. 4 shows the relationship between the aspect ratio of the magnetic iron oxide particles comprising the spindle-like maghemite particles containing Si and the amount of water-soluble silicate.

FIG. 3 shows the relationship between the aspect ratio (major axis:minor axis) of the spindle-like magnetite particles and amount of addition of the water-soluble silicate, and FIG. 4 shows the relationship between the aspect ratio (major axis:minor axis) of the spindle-like maghemite particle and amount of addition of the water-soluble silicate.

The above-mentioned spindle-like magnetite particles were obtained by thermally reducing the afore-mentioned spindle-like goethite particles containing Si for 45 min at 400° C.

As are clearly seen in FIG. 3, the aspect ratio (major axis:minor axis) of the spindle-like magnetite particles containing Si shows a tendency of reduction with the increase of the amount of addition of the water-soluble silicate in the preparation of the goethite. In this connection, in the case where the amount of the added water-soluble silicate is more than 0.1 atomic % (calculated as Si) to Fe of the ferrous sulfate, it is possible to reduce the aspect ratio (major axis:minor axis) of the thus obtained spindle-like magnetite particles containing Si to less than 4:1, and in the case where the amount thereof is more than 0.3 atomic % (calculated as Si) to Fe of the ferrous sulfate, it is possible to reduce the aspect ratio to less than 2:1.

FIG. 4 shows the relationship between the aspect ratio (major axis:minor axis) of the spindle-like maghemite particles containing Si obtained by oxidizing the spindle-like magnetite particles containing Si shown in FIG. 3 for 15 min in air and the amount of addition of the water-soluble silicate, and as are clearly seen in FIG. 4, the aspect ratio (major axis:minor axis) of the spindle-like maghemite particles shows a tendency of reduction with the increase of the amount of the added water-soluble silicate.

Namely, in the case where the amount of the added water-soluble silicate is more than 0.1 atomic % (calculated as Si) to Fe of the ferrous sulfate, it is possible to reduce the aspect ratio of the spindle-like maghemite particles containing Si to less than 4:1, and in the case where the amount thereof is more than 0.3 atomic % (calculated as Si) to Fe of the ferrous sulfate, it is possible to reduce the aspect ratio to less than 2:1.

Figure 5:
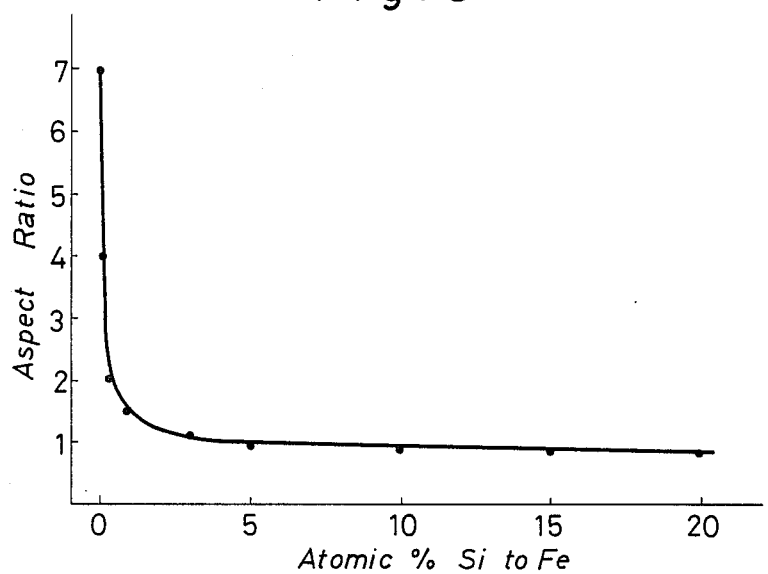
FIG. 5 shows the relationship between the aspect ratio of the spindle-like goethite particles containing Si and Co and the amount of the water-soluble silicate.

Furthermore, FIG. 5 shows the relationship between the aspect ratio of the spindle-like goethite particles containing Si and Co and the amount of addition of the water-soluble silicate.

Namely, into 2.0 liters of an aqueous solution of sodium carbonate obtained by adding sodium silicate in an amount of 0 to 20 atomic % (calculated as Si) to Fe of ferrous sulfate and cobalt sulfate in an amount of 4.5 atomic % (calculated as Co) to Fe of the ferrous sulfate, 3.0 liters of an aqueous solution of ferrous sulfate containing 1.0 mol of $Fe^{2+}$ per liter $FeCO_3$ (about pH 10)and air was blown into the thus obtained aqueous suspension at a rate of 15 liters/min and at a temperature of 50° C. to oxidize $FeCO_3$ in the aqueous suspension thereby obtaining the spindle-like goethite particles containing Si and Co.

As are clearly seen in FIG. 5, the aspect ratio (major axis:minor axis) of the thus obtained spindle-like goethite particles containing Si and Co shows a tendency of reduction with the increase of the amount of the added water-soluble silicate.

Figure 6:
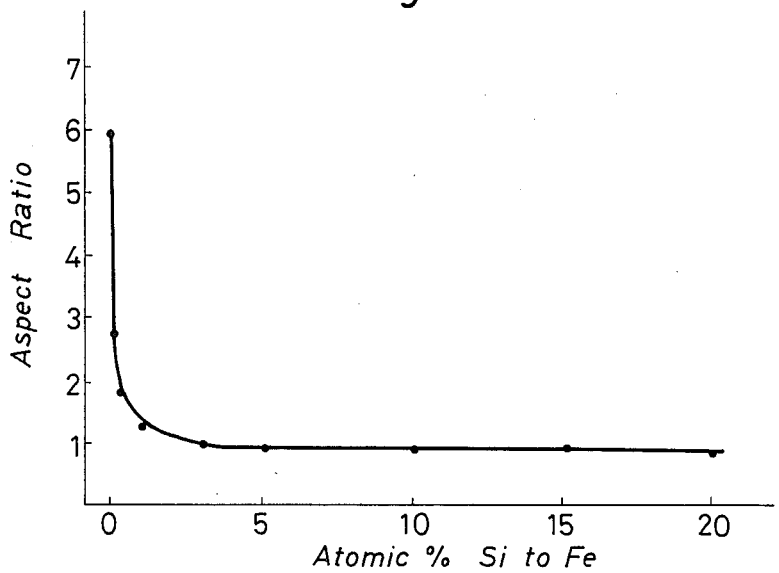
FIG. 6 shows the relationship between the aspect ratio of the magnetic iron oxide particles comprising the spindle-like magnetite particles containing Si and Co and the amount of water-soluble silicate.
Figure 7:
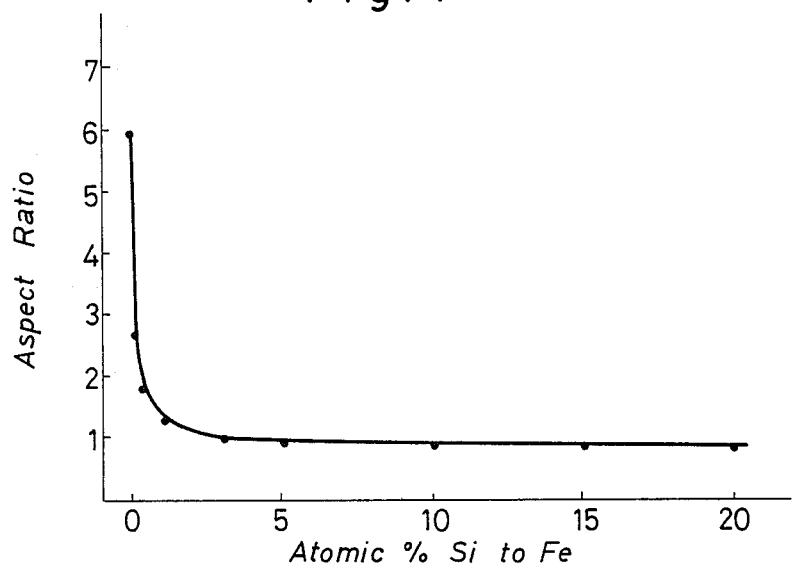
FIG. 7 shows the relationship between the aspect ratio of the magnetic iron oxide particles comprising the spindle-like maghemite particles containing Si and Co and the amount of water-soluble silicate.

FIG. 6 and FIG. 7 show the relationship between the aspect ratio of the spindle-like magnetite or maghemite particles containing Si and Co and an amount of addition of the water-soluble silicate, FIG. 6 concerning the magnetite particles and FIG. 7 concerning the maghemite particles.

Namely, the magnetite particles shown in FIG. 6 were obtained by thermally reducing the spindle-like goethite particles containing Si and Co shown in FIG. 5 for 45 min at 400° C. in a reductive gas.

As are clearly seen in FIG. 6, the aspect ratio (major axis:minor axis) of the spindle-like magnetite particles containing Si and Co shows a tendency of reduction with the increase of the amount of addition of the water-soluble silicate. Namely in the case where the amount of the added water-soluble silicate is more than 0.1 atomic % (calculated as Si) to Fe of the ferrous sulfate, it is possible to reduce the aspect ratio to less than 4:1 and in the case where the amount of the added water-soluble silicate is more than 0.3 atomic % (calculated as Si) to Fe of the ferrous sulfate, it is possible to obtain the particles having the aspect ratio of less than 2:1.

The spindle-like maghemite particles containing Si and Co of FIG. 7 were obtained by oxidizing the spindle-like magnetite particles containing Si and Co shown in FIG. 6 for 15 min in air, and as are clearly seen in FIG. 7, there is a tendency of reduction of the aspect ratio (major axis: minor axis) of the spindle-like maghemite particles containing Si and Co with the increase of the amount of the addition of the water-soluble silicate. In addition, in the case where the amount of the added water-soluble silicate is more than 0.1 atomic % (calculated as Si) to Fe of the ferrous sulfate, it is possible to reduce the aspect ratio of the maghemite particles to less than 4:1, and in the case where the amount of the added water-soluble silicate is more than 0.3 atomic (calculated as Si) to Fe of the ferrous sulfate, it is possible to reduce the aspect ratio to less than 2:1.

Figure 8:
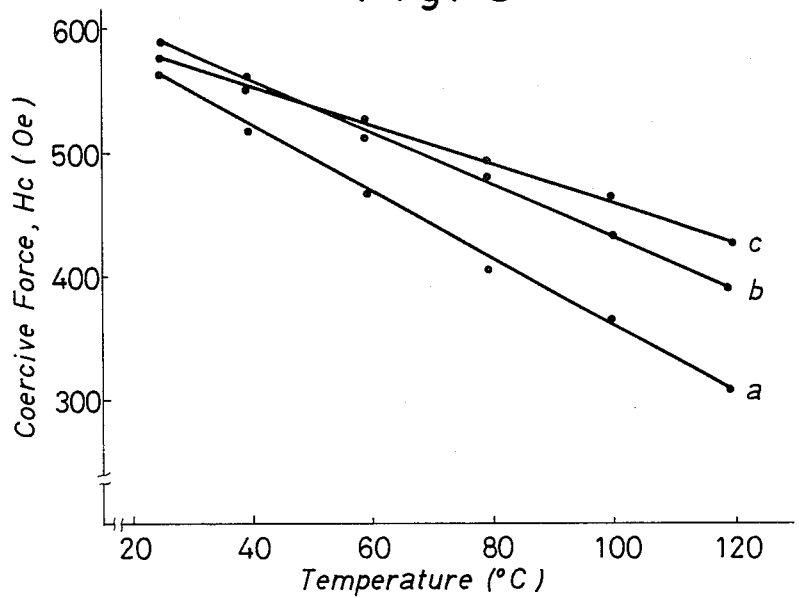
FIG. 8 shows the relationship between the coercive force of the magnetic iron oxide particles comprising the spindle-like magnetite particles containing Si and Co and the temperature.

FIG. 8 shows the relationship between the coercive force (Hc) of the spindle-like magnetite particles containing Si and Co shown in FIG. 6 and a temperature, the lines a, b and c showing the respective cases wherein the content of Si to Fe is 0, 2 atomic % and 6 atomic %. As are clearly seen in FIG. 8, the thermo-stability of the particles is improved with the increase of the content of Si to Fe.

Figure 9:
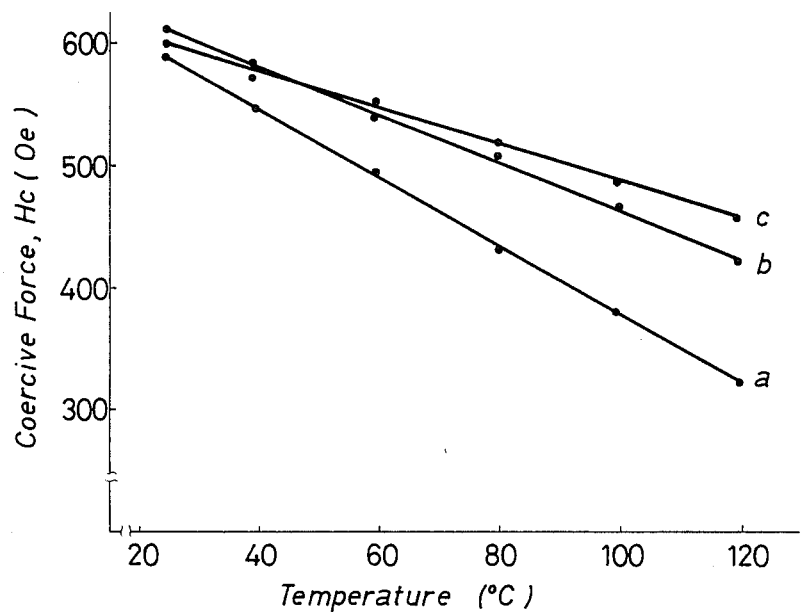
FIG. 9 shows the relationship between the coercive force of the magnetic iron oxide particles comprising the spindle-like maghemite containing Si and Co and the temperature.

FIG. 9 shows the relationship between the coercive force (Hc) of the spindle-like maghemite particles containing Si and Co shown in FIG. 7 and a temperature, the lines a, b and c showing the respective cases wherein the content of Si to Fe is 0, 2 atomic % and 6 atomic %. As are clearly seen in FIG. 9, there is a tendency of improvement of the thermo-stability with the increase of the content of Si to Fe.

Figure 10:
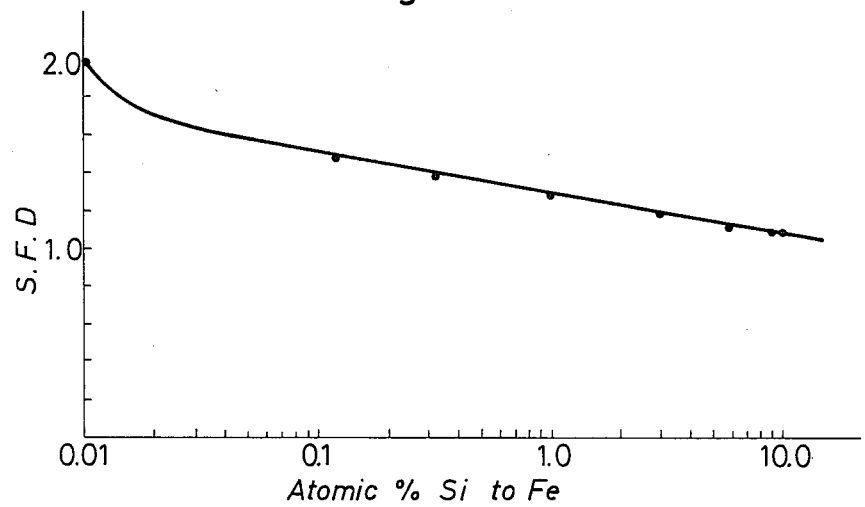
FIG. 10 shows the relationship of the Switching Field Distribution (S.F.D.) of the spindle-like maghemite particles containing Si, coated by cobalt and the content of Si in the particles.

FIG. 10 shows the relationship of S.F.D. of the spindle-like maghemite particles containing Si obtained by coating the spindle-like maghemite particles containing Si shown in FIG. 4 with 4.0 atomic % (calculated as Co) to Fe and the content of Si of the particles.

As are clearly seen in FIG. 10, the S.F.D. is clearly reduced with the increase of the content of Si, namely, the distribution of the coercive force is narrow with the increase of the content of Si of the particles.

Furthermore, S.F.D. (Switching Field Distribution) is obtained by drawing the first-order derived function of the coercive force from the hysteresis-loop of the magnetic iron oxide particle in the second (or fourth) quadrant and dividing a half width of the curve by the coercive force (Hc) at a peak of the curve. A distribution of the coercive force becomes narrower with the decrease of the value of S.F.D.

The distribution of the coercive force of the magnetic coating medium prepared by coating depends upon the distribution of the coercive force of the magnetic iron oxide particles coated by Co, used for preparing the medium. By using the magnetic iron oxide particles having a narrow distribution of the coercive force, the magnetic coating medium having narrow distribution of the coercive force can be prepared. By the way, the S.F.D. of the magnetic coating medium can be obtained in the same method as in the case of the above-mentioned magnetic iron oxide particles.

The conditions in carrying out the present invention are described as follows.

For preparing the aqueous solution of a ferrous salt used in the present invention, ferrous sulfate, ferrous chloride and the like are exemplified.

As the alkali carbonate used in the present invention, sodium carbonate, potassium carbonate and ammonium carbonate may be mentioned.

Such an alkali carbonate can be used singly or in combination with an alkali hydrogen carbonate such as sodium hydrogencarbonate, potassium hydrogencarbonate, ammonium hydrogencarbonate and the like.

The reaction temperature for preparing the spindle-like goethite particles according to the present invention is from 40° to 80° C., and it is difficult to obtain the spindle-like goethite particles at a temperature of below 40° C., and on the other hand, at a temperature of over 80° C., the product is contaminated by particles of $Fe_3O_4$.

The reaction for preparing the spindle-like goethite particles according to the present invention is carried out at a pH of from 7 to 11, and at the pH of below 7 or over 11, it is difficult to obtain the spindle-like goethite particles.

The oxidation of $FeCO_3$ in the aqueous suspension is conducted by blowing an oxygen-containing gas, for instance, air into the aqueous suspension.

As the water-soluble silicate for use in the present invention, sodium silicate and potassium silicate may be exemplified.

The water-soluble silicate used in the present invention participates in determination of the aspect ratio (major axis:minor axis) of the formed spindle-like goethite particles and accordingly, it is necessary to bring the water-soluble silicate into existence in the reaction system before the formation of the spindle-like goethite particles.

Namely, the water-soluble silicate may be added to the aqueous solution of the ferrous salt, the aqueous solution of alkali carbonate or the aqueous suspension containing $FeCO_3$ before blowing the oxygen-containing gas thereinto.

The amount of addition of the water-soluble silicate in the present invention is 0.1 to 20 atomic % (calculated as Si) to Fe and in the case of below 0.1 atomic % (calculated as Si) to Fe, the effect of reducing the aspect ratio (major axis:minor axis) of the spindle-like magnetite or maghemite particles can not be sufficiently attained. On the other hand, in the case of over 20 atomic % (calculated as Si) to Fe, the saturation magnetization of the magnetic iron oxide particles obtained by reducing the thus-formed spindle-like goethite particles and optionally oxidizing the thus reduced particles is reduced.

In view of the aspect ratio (major axis:minor axis) and the saturation magnetization of the spindle-like magnetite or maghemite particles, the amount of addition of the water-soluble silicate is preferably from 0.3 to 15 atomic % (calculated as Si) to Fe.

The thus added amount of the water-soluble silicate is almost entirely contained in the thus formed goethite particles, and as are shown in Table 1, the goethite particles contain nearly the same amount of Si as that added, namely the amount of 0.14 to 11.01 atomic % (calculated as Si) to Fe therein, and the magnetic iron oxide particles obtained by subjecting the goethite particles to thermal reduction and optionally oxidizing the thus reduced particles contain nearly the same amount of Si as that added, namely the amount of 0.13 to 10.99 atomic % (calculated as Si) to Fe therein as are shown in Tables 2 and 3.

In the case of producing the magnetic iron oxide particles comprising the spindle-like magnetite particles containing Si and Co, the added amount of the water-soluble silicate is also almost entirely contained in the formed goethite particles and as are shown in Table 4, the goethite particles contain nearly the same amount of Si as that added, namely the amount of 0.38 to 12.98 atomic % (calculated as Si) to Fe therein, and also the magnetic iron oxide particles obtained by subjecting the goethite particles to thermal reduction and optionally oxidizing the thus reduced particles contain nearly the same amount of Si as that added, namely the amount of 0.37 to 12.99 atomic (calculated as Si) to Fe, as are shown in Tables 5 and 6.

As the water-soluble cobalt salt for use in the present invention, cobalt sulfate and cobalt chloride are mentioned. The water-soluble cobalt salt used in the present invention participates in the improvement of the coercive force of the spindle-like magnetic iron oxide particles obtained by reducing the spindle-like goethite particles and optionally oxidizing the thus reduced particles, and it is necessary that the water-soluble cobalt salt is contained in the thus formed goethite particles. Accordingly, the water-soluble cobalt salt may be added to the aqueous solution of the ferrous salt, the aqueous solution of alkali carbonate or the aqueous suspension containing $FeCO_3$ before blowing the oxygen-containing gas into the aqueous suspension.

The amount of addition of the water-soluble cobalt salt according to the present invention is 0.5 to 10.0 atomic (calculated as Co) to Fe and in the case where the amount thereof is below 0.5 atomic % (calculated as Co) to Fe, the effect of improving the coercive force of the thus obtained spindle-like magnetite or maghemite particles is not sufficiently attained, and on the other hand, in the case where the amount thereof is over 10.0 atomic % (calculated as Co) to Fe, the effect of improving the thermo-stability of the thus obtained spindle-like magnetite or maghemite particles is not sufficiently exhibited.

In view of the coercive force and the thermostability of the spindle-like magnetite or maghemite particles, the amount of addition of the water-soluble cobalt salt is preferably 4.0 to 7.0 atomic % (calculated as Co) to Fe.

Almost all of the added amount of the water-soluble cobalt salt is contained in the thus formed goethite particles and as are shown in Table 4, the thus obtained goethite particles contain nearly the same amount of Co as that added, namely the amount of 1.01 to 7.99 atomic % (calculated as Co) to Fe therein, and as are shown in Tables 5 and 6, the magnetic iron oxide particles obtained by subjecting the goethite particles containing Si and Co to thermal reduction and optionally oxidizing the thus reduced particles contain nearly the same amount of Co as that added, namely the amount of 0.97 to 7.98 atomic % (calculated as Co) to Fe therein.

The coating of the spindle-like magnetite or maghemite particles coated by cobalt can be carried out by an ordinary method, and for instance, as are described in Japanese Patent Publications No. 52-24237 (1977), No. 52-24238 (1977), No.52-36751 (1977) and No. 52-36863 (1977), the spindle-like magnetite or maghemite particles(precursor) are dispersed in an aqueous alkaline suspension of cobalt hydroxide or both cobalt hydroxide and ferrous hydroxide and the aqueous dispersion is subjected to thermal treatment in a non-oxidative atmosphere at 50° to 100° C.

Cobalt hydroxide for use in the present invention is prepared by mixing a water-soluble cobalt salt such as cobalt sulfate, cobalt chloride and the like with an aqueous solution of an alkali hydroxide such as sodium hydroxide and potassium hydroxide.

Ferrous hydroxide for use in the present invention is prepared by mixing a water-soluble ferrous salt such as ferrous sulfate, ferrous chloride and the like with an aqueous solution of an alkali hydroxide such as sodium hydroxide and potassium hydroxide.

The temperature at which the coating by cobalt is carried out depends on the treatment time of the precursor (the spindle-like magnetite or maghemite particles) in coating, and at the temperature of below 50° C., it is difficult to prepare the spindle-like magnetite or maghemite particles coated by Co or both Co and $Fe^{2+}$ and even if they could be prepared, it takes a very long time for treating the precursor in coating.

The reason why the coating by cobalt is carried out in the non-oxidative atmosphere depends on the fact that the coating is effected only when cobalt and $Fe^{2+}$ are in the state of hydroxide, and the oxidation of cobalt hydroxide and ferrous hydroxide in the aqueous dispersion is prevented by the non-oxidative atmosphere.

The amount of the water-soluble cobalt salt used for coating according to the present invention is 0.5 to 15.0 atomic % (calculated as Co) to Fe. In the case of below 0.5 atomic % (calculated as Co) to Fe, the effect of improving the coercive force of the thus obtained spindle-like magnetite or maghemite particles coated by Co is not sufficiently attained, and on the other hand, in the case of over 15.0 atomic % (calculated as Co) to Fe, the effect of narrowing the distribution of the coercive force of the thus obtained spindle-like magnetite or maghemite particles coated by Co is not sufficiently exhibited.

Almost all of the added amount of the water-soluble cobalt salt to the aqueous dispersion of the spindle-like magnetite or maghemite particles are utilized for the coating on the surface of the spindle-like magnetite or maghemite particles.

In view of the coercive force and the distribution of the coercive force of the spindle-like magnetite or maghemite particles, the amount of the water-soluble cobalt salt used in the coating is preferably 2.0 to 13.0 atomic (calculated as Co) to Fe therein.

The thermal reduction of the spindle-like goethite particles or hematite particles in the present invention can be carried out following the conventional method at 300° to 500° C. In the case where the reduction is carried out at a temperature below 300° C., the progress of thermal reduction is slow and it takes a long time for completing the reduction. On the other hand, in the case of carrying out the thermal reduction at a temperature over 500° C., the reduction progresses violently to cause the deformation of the shape and form of and the sintering between the magnetic particles.

The present invention of the above-mentioned constitution is effective in the following result.

Namely, according to the present invention, it is possible to obtain the magnetic iron oxide particles comprising the spindle-like magnetite or maghemite particles containing Si which are uniform in particle size and shape, not contaminated by the dendrites and show a small aspect ratio (major axis:minor axis) of less than 4:1, particularly less than 2:1 and have a coercive force of more than 175 Oe, preferably 200 to 350 Oe, these particles being suitable as the magnetic material for magnetic recording of a high density, which are most keenly demanded.

In addition, in the case of utilizing the above-mentioned spindle-like magnetite or maghemite particles for production of magnetic paints, since the particles are excellent in dispersing in the vehicle thereof and in orientation and loading thereof in the coating medium, it is possible to obtain favorable media for magnetic recording.

The above-mentioned effects of the present invention is also available even in the conventional case where other metal such as Co, Mg, Al, Cr, Zn, Ni, Ti, Mn, Sn, Pb, etc. than Fe is added to the system of formation of the spindle-like goethite particles as the starting material for improving the various specific properties of the magnetic iron oxide particles.

Furthermore, the magnetic iron oxide particles comprising spindle-like magnetite or maghemite particles containing Si and Co according to the present invention are small in the aspect ratio (major axis: minor axis) thereof of less than 4:1, particularly, less than 2:1 and have a high coercive force of 300 to 900 Oe, an excellent thermo-stability, and a tendency that the aspect ratio (major axis:minor axis) thereof becomes to reduce with the increase of the content of Si therein and the particles show the shape magnetic isotropy and the magneto crystalline isotropy with the increase of the content of Si therein.

Although it has not been clarified why the magnetic iron oxide particles comprising spindle-like magnetite or maghemite particles containing Si and Co according to the present invention is excellent in the thermo-stability, the present inventors are of the opinion that the thermostability is due to the synergetic effect of Si and Co, because there is a tendency of improving the thermo-stability with the increase of the content of Si therein.

One of the features of the present invention is the use of the spindle-like magnetite or maghemite particles containing Si which are uniform in particle size and shape, not contaminated by the dendrites and have a small aspect ratio (major axis: minor axis) as the precursor to be coated by Co in the production of the spindle-like magnetic iron oxide particles coated by Co which have a high coercive force and a narrow distribution of coercive force.

Although it has not yet been clarified why the distribution of the coercive force of the magnetic iron oxide particles according to the present invention is narrow, the present inventors are o the opinion that it is due to the small fluctuation of the amount of Co used for coating between the particles because of the uniformity of the size and shape of the spindle-like of magnetite or maghemite particles containing Si used as the precursor, the uniformity of the size and shape being due to the method for preparing the goethite particles as the starting material.

In this connection, the aspect ratio(major axis: minor axis) and the length of the major axis of the particles shown in the Examples indicate the mean values of actual values measured on particle appearing in the electron microscope photograph, and the apparent density of the particles was determined while following Japanese Industrial Standards (JIS) K 5101 "Test Method of Pigments".

The amount of Si, Co, Zn and Ni in the particles was determined by X-ray fluorescent analysis while following the method in JIS K 0119 "General Rules in X-ray Fluorescent Analysis" and using an X-ray fluorescent analyzing apparatus (Model 3063 M, made by RIGAKUDENKI KOGYO Co., Ltd.).

The thermo-stability of the magnetic iron oxide particles is shown by the difference between the value of coercive force at 25° C. and the value of coercive force at 120° C. in Oe.

The magnetic specific properties of the magnetic iron oxide particles and of the magnetic coating medium were determined by using a specimen-vibrating type magnetometer (model VSM P-1, made by TOEI Industrial Co., Ltd.) in a magnetic field of 5 KOe in the case of the magnetic particles and 10 KOe in the case of the coating medium.

S.F.D. was determined by drawing a differential curve of the coercive force (Hc) on a chart by using a differentiation circuit of the above-mentioned magnetic property measurement device and dividing a half width by the value (Hc) at a peak of the curve.

The present invention will be explained more in detail while referring to the following, non-limitative Examples.

EXAMPLES 1–12 and COMPARATIVE EXAMPLE 1

Formation of Spindle-like Goethite Particles Containing Si

EXAMPLE 1

Into 20 liters of an aqueous solution of 3.53 mol/liter of sodium carbonate prepared by adding 9.5 g of sodium silicate (No. 3, content of $SiO_2$ of 28.55% by weight) so as to contain 0.15 atomic % (calculated as Si) to Fe, 30 liters of an aqueous solution of ferrous sulfate containing 1.0 mol of $Fe^{2+}$ per liter were added, and the mixture was heated to 50° C. at a pH of 9.9, thereby forming $FeCO_3$ containing Si.

Into the thus obtained aqueous solution containing $FeCO_3$, air was blown at a rate of 130 liters/min for 6.5 hours at 50° C., thereby forming the goethite particles containing Si. The endpoint of the oxidation was judged by taking a part of the reaction mixture out of the reactor, adjusting thereof to acidic with hydrochloric acid and adding an aqueous solution of red prussiate of potash thereto to see the presence or absence of blue colour due to $Fe^{2+}$.

The thus formed particles were collected by filtration, washed with water, dried and pulverized.

The thus obtained goethite particles containing Si comprise, as will be seen clearly from the electron microscope photograph (×20000) shown in FIG. 11, the spindle-like particles of a mean length of major axis of 0.43 μm and an aspect ratio (major axis: minor axis) of 3:1, which were uniform in particle size and shape and were not contaminated by dendrites. In addition, an apparent density of the goethite particles was 0.39 g/cc, and according to X-ray fluorescent analysis, the content of Si thereof was 0.14 atomic % to Fe therein.

EXAMPLES 2 to 12

In the same manner as in Example 1 except for changing the conditions; (1) the kind of the aqueous solution of $Fe^{2+}$, (2) the kind and concentration of the aqueous solution of the alkali carbonate, (3) the kind, the amount of addition and the time of addition of the water-soluble silicate, (4) the kind, the amount of addition of the metal ion and (5) the reaction temperature as are shown in Table 1, the spindle-like goethite particles were prepared. The thus obtained several kinds of the goethite particles are also shown in Table 1 with their specific properties. Of the thus prepared particles, those obtained in Examples 3 and 5 are shown in FIG. 12 and FIG. 13, respectively as the electron microscope photographs (×20000) thereof.

COMPARATIVE EXAMPLE 1

In the same manner as in Example 1 except for not adding the sodium silicate, goethite particles were prepared. The thus obtained goethite particles showed, as is clearly seen in the electron microscope photograph (×20000) shown in FIG. 14, a mean length of the major axis of 0.55 micrometer, an aspect ratio (major axis:minor axis) of 7:1 and an apparent density of 0.33 g/cc.

EXAMPLE 13

Preparation of the Spindle-like Hematite Particles Containing Si

The spindle-like hematite particles containing Si were prepared by thermally dehydrating the spindle-like goethite particles containing Si obtained in Example 2, in air at 300° C.

The thus obtained particles showed a mean length of the major axis of 0.21 μm and an aspect ratio (major axis:minor axis) of 1.8:1 as a result of electron microscopic observation. In addition as a result of X-ray fluorescent analysis thereof the hematite particles contained 0.35 atomic % (calculated as Si) to Fe therein, and showed an apparent density of 0.48 g/cc.

EXAMPLES 14 to 26 and COMPARATIVE EXAMPLE 2

Preparation of the Spindle-like Magnetite Particles Containing Si

EXAMPLE 14

The spindle-like magnetite particles containing Si were obtained by introducing 1000 g of the spindle-like goethite particles containing Si obtained in Example 1 into a retort-type reducing reactor of a capacity of 10 liters, and passing gaseous hydrogen through the reactor at a rate of 2 liters/min at 400° C. while rotating the reactor, thereby reducing the goethite particles.

As a result of X-ray fluorescent analysis, the thus obtained spindle-like magnetite particles containing Si contained 0.13 atomic % (calculated as Si) to Fe therein, and as a result of observation of the electron microscope photograph ($\times 20000$) shown in FIG. 15, the mean length of the major axis thereof was 0.30 µm and an aspect ratio (major axis:minor axis) thereof was 2.7:1 and the particles were uniform in particles size and shape and were not contaminated by dendrites.

As the result of determination of magnetic properties, the coercive force (Hc) and saturation magnetization (σs) of the thus obtained magnetite particles were 296 Oe and 83.6 emu/g, respectively.

EXAMPLES 15 to 26 and COMPARATIVE EXAMPLE 2

In the same manner as in Example 14 except for changing the kind of the starting material and the temperature of reduction as are shown in Table 2, the spindle-like magnetite particles containing Si were prepared, the specific properties of the thus obtained particles and main conditions of the preparation thereof being shown also in Table 2.

As a result of observation by an electron microscope photograph, all of the thus produced spindle-like magnetite particles containing Si were uniform in particle size and shape and not contaminated by dendrites.

Electron microscope photographs ($\times 20000$) of the spindle-like magnetite particles containing Si obtained respectively, in Examples 16 and 18, and Comparative Example 2 are shown in FIG. 16, FIG. 17 and FIG. 18.

EXAMPLES 27 to 39 and COMPARATIVE EXAMPLE 3

Preparation of the Spindle-like Maghemite Particles Containing Si

EXAMPLE 27

The spindle-like maghemite particles containing Si were prepared by oxidizing 700 g of the spindle-like magnetite particles containing Si obtained in Example 14, in air at 300° C. for 60 min.

As a result of X-ray fluorescent analysis, the thus obtained spindle-like maghemite particles containing Si contain 0.14 atomic % (calculated as Si) to Fe therein, and as a result of observation of the electron microscope photograph ($\times 20000$) shown in FIG. 19, the mean length of the major axis thereof is 0.30 µm, an aspect ratio (major axis:minor axis) thereof is 2.7:1, and the particles are uniform in particle size and shape and not contaminated by dendrite. In addition, as the result of determination of the magnetic properties, the coercive force (Hc) thereof is 278 Oe and saturation magnetization (σs) thereof is 73.5 emu/g.

EXAMPLES 28 to 39 and COMPARATIVE EXAMPLE 3

In the same manner as in Example 27 except for changing the kind of the spindle-like magnetite particles containing Si as shown in Table 3, the spindle-like maghemite particles containing Si were prepared. Those particles obtained in Examples 28 to 39 were, as the result of observation by an electron microscope, uniform in particle size and shape and not contaminated by dendrite. The spindle-like maghemite particles containing Si obtained in Examples 29 and 31 and Comparative Example 3 (obtained from the precursor prepared in Comparative Example 2) are shown in FIGS. 20, 21 and 22 by their electron microscope photographs ($\times 20000$), respectively.

EXAMPLES 40 to 48

Preparation of the Spindle-like Goethite Particles Containing Si and Co

EXAMPLE 40

Into 20 liters of an aqueous solution of sodium carbonate containing 3.53 mol/liter of $Na_2CO_3$ which had been added with 337.2 g of cobalt sulfate so as to contain 4.0 atomic % (calculated as Co) to Fe and 25.3 g of sodium silicate (No. 3, containing 28.55% by weight of $SiO_2$ so as to contain 0.4 atomic % (calculated as Si) to Fe, 30 liters, of an aqueous solution of ferrous sulfate containing 1.0 mol/of $Fe^{2+}$ were added, and the mixture was treated at 50° C. and at a pH of 9.9 to form $FeCO_3$ containing both Si and Co.

Into the thus obtained aqueous solution containing $FeCO_3$ together with Si and Co, air was blown for 6.5 hours at a rate of 130 liters/min at 50° C. to form the goethite particles containing Si and Co, the endpoint of the reaction being judged by taking a part of the reaction mixture, adjusting thereof to acidic with hydrochloric acid, and adding a red prussiate of potash thereto to observe the blue colour due to the presence of $Fe^{2+}$.

The thus formed particles were collected by filtration, washed with water, dried and pulverized according to a conventional method.

These goethite particles containing Si and Co comprise the spindle-like particles of a mean length of the major axis of 0.17 µm and an aspect ratio (major axis:minor axis) of 1.5:1, as shown in the electron microscope photograph ($\times 20000$) shown in FIG. 23 and are uniform in particle size and shape without being contaminated by dendrites. In addition, according to the X-ray fluorescent analysis, the spindle-like goethite particles contain 0.41 atomic % (calculated as Si) to Fe and 3.99 atomic % (calculated as Co) to Fe therein.

EXAMPLES 41 to 48

In the same manner as in Example 40 except for changing the conditions; (1) the kinds of the aqueous ferrous salt solution and the alkali carbonate, (2) the kind, the amount of addition and the time of addition of the water-soluble silicate, (3) the kind, the amount of addition and the time of addition of the water-soluble cobalt salt and (4) the reaction temperature, the spindle-like goethite particles were prepared, the thus changed conditions and the specific properties of the thus formed spindle-like goethite particles being shown in Table 4.

The spindle-like goethite particles containing Si and Co obtained in Example 43 are shown by their electron microscope photograph (×20000) shown in FIG. 24.

EXAMPLE 49

Preparation of the Spindle-like Hematite Particles Containing Si and Co

By thermally dehydrating 1000 g of the spindle-like goethite particles containing Si and Co obtained in Example 41 in air at 300° C., the spindle-like hematite particles containing Si and Co were obtained.

The thus obtained particles show the mean length of the major axis of 0.15 μm and an aspect ratio (major axis:minor axis) of 1.3:1 as the result of electron microscopic observation, and they were uniform in particle size and shape without being contaminated by the dendrite.

In addition, as a result of X-ray fluorescent analysis, the particles contained 6.01 atomic % (calculated as Si) to Fe and 3.99 atomic % of Co to Fe therein.

EXAMPLES 50 to 59

Preparation of the Spindle-like Magnetite Particles Containing Si and Co

EXAMPLE 50

Into a retort-type reducing reactor of a capacity of 10 liters, 1000 g of the spindle-like goethite particles containing Si and Co obtained in Example 40 were introduced and gaseous hydrogen was passed through the reactor at a rate of 2 liters/min while rotating the reactor, thereby reducing the goethite particles at 400° C. to obtain the spindle-like magnetite particles containing Si and Co.

As a result of X-ray fluorescent analysis, the thus obtained spindle-like magnetite particles containing Si and Co contain 0.40 atomic % (calculated as Si) to Fe and 3.98 atomic % (calculated as Co) to Fe therein, and as are seen in the electron microscope photograph (×20000) shown in FIG. 25, the mean length of the major axis thereof was 0.15 μm and an aspect ratio (major axis:minor axis) was 1.5:1.

These particles were uniform in size and shape without being contaminated by dendrites.

In addition, as the result of determination of magnetic properties, the coercive force (Hc) and saturation magnetization ($\sigma_s$) thereof were 615 Oe and 83.2 emu/g respectively as well as the thermo-stability was 180 Oe.

EXAMPLES 51 to 59

In the same manner as in Example 50 except for changing the kind of the starting material and the temperature for reduction as those shown in Table 5, the spindle-like magnetite particles containing Si and Co were prepared, the major reaction conditions and the specific properties of the products being also shown in Table 5.

According to the result of electron microscope photographic observation, the spindle-like magnetite particles containing Si and Co were uniform in particle size and shape without being contaminated by dendrites. The electron microscope photograph (×20000) of the spindle-like magnetite particles containing Si and Co obtained in Example 53 is shown in FIG. 26.

EXAMPLES 60 to 69

Preparation of the Spindle-like Maghemite Particles Containing Si and Co

EXAMPLE 60

By oxidizing 700 g of the spindle-like magnetite particles containing Si and Co obtained in Example 50 in air at 300° C. for 60 min, the spindle-like maghemite particles containing Si and Co were obtained.

As the result of X-ray fluorescent analysis, the thus obtained spindle-like maghemite particles containing 0.40 atomic % (calculated as Si) and 3.98 atomic % (calculated as Co) to Fe therein, and as are clearly seen in the electron microscope photograph (×20000) shown in FIG. 27, the particle showed a mean length of the major axis of 0.15 μm and an aspect ratio (major axis:minor axis) of 1.5:1, and were uniform in particle size and shape without being contaminated by dendrite. As the result of determination of magnetic properties, the coercive force (Hc) and saturation magnetization of the thus obtained particles were 610 Oe and 73.0 emu/g, respectively, and the thermo-stability was 170 Oe.

EXAMPLES 61 to 69

In the same manner as in Example 60 except for changing the kind of the spindle-like magnetite particles containing Si and Co as shown in Table 6, the spindle-like maghemite particles containing Si and Co were produced. The conditions of the production and the specific properties of the products are also shown in Table 6.

As the result of observation of the spindle-like maghemite particles containing Si and Co obtained in Examples 61 to 69 by electron microscopic observation, these particles were uniform in particle size and shape without being contaminated by dendrites. Of these particles, those obtained in Example 63 were shown by their electron microscope photograph (×20000) in FIG. 28.

EXAMPLE 70 to 79

Preparation of Magnetic Tapes

EXAMPLE 70

The spindle-like magnetite particles containing Si and Co obtained in Example 50 were mixed with a suitable amount of a dispersing agent, a copolymer of vinyl chloride and vinyl acetate, a thermoplastic polyurethane and a mixed solvent comprising toluene, methyl ethyl ketone and methyl isobutyl ketone to be a mixture of a predetermined composition, and a magnetic paint was prepared by treating the mixture in a ball-mil for 8 hours.

After adding the above-mentioned mixed solvent to the thus prepared paint to adjust the viscosity thereof to a suitable value, the thus adjusted magnetic paint was coated on a polyester resin film, and by drying the film according to a conventional method, a magnetic tape was prepared.

The coercive force (Hc), the residual magnetic flux density (Br), the squareness ratio (Br/Bm) and the orientation ratio of the thus obtained magnetic tape were 621 Oe, 1450 Gauss, 0.75 and 1.00, respectively.

EXAMPLES 71 to 79

In the same manner as in Example 70 except for changing the kind of the magnetic iron oxide particles as shown in Table 7, the magnetic tapes were prepared. Their specific properties are also shown in Table 7.

EXAMPLES 80 to 86 and COMPARATIVE EXAMPLE 4

Preparation of the Spindle-like Magnetite Particles Coated by Cobalt

EXAMPLE 80

In 1.0 liter of an aqueous solution of cobalt sulfate and ferrous sulfate containing 0.085 mol of Co and 0.179 mol of $Fe^{2+}$, 100 g of the spindle-like magnetite particles containing Si obtained in Example 18 were added while taking care of preventing the intermingling of air thereinto, thereby dispersing the particles to form a slurry. Then, 102 ml of an aqueous 18-N NaOH solution were added to the aqueous dispersion, and water was further added to the alkaline dispersion to obtain 1.3 liters of an aqueous dispersion containing OH group of 1.0 mol/liter.

After heating the dispersion to 100° C. and stirring the thus heated dispersion for 5 hours at that temperature, the dispersion was filtered to obtain a precipitate, which was washed with water and dried at 60° C. to obtain the spindle-like magnetite particles containing Si which had been coated by cobalt.

The thus obtained particles, as a result of observation by electron microscope, inherited the shape and the particle size of the spindle-like magnetite particles containing Si at the precursor thereof, and were the spindle-like particles of the length of major axis of 0.15 μm and of an aspect ratio (major axis:minor axis) of 1:1. As the result of determination of magnetic properties, these particles showed the coercive force (Hc) of 654 Oe, the saturation magnetization ($\sigma_s$) of 85.8 emu/g and S.F.D. of 1.1. The particles contained 5.2 atomic % (calculated as Si) and 5.9 atomic % (calculated as Co), respectively to Fe therein.

EXAMPLES 81 to 86 and COMPARATIVE EXAMPLE 4

In the same manner as Example 80 except for changing the kind of the precursor (the spindle-like magnetite particles containing Si), the added amount of cobalt, the added amount of $Fe_{2+}$ and the amount of NaOH as shown in Table 8, the spindle-like particles containing Si coated by Co or both Co and $Fe^{2+}$ were obtained. The specific properties of the thus obtained magnetite particles and reaction conditions are shown also in Table 8.

Electron microscope photographs (×20000) of the spindle-like magnetite particles containing Si coated by Co and $Fe^{2+}$, obtained respectively in Examples 82, 86 and 81 are shown in FIGS. 29, 30 and 31.

EXAMPLES 87 to 93 and COMPARATIVE EXAMPLE 5

Preparation of the Spindle-like Maghemite Particles Containing Si Coated by Cobalt

EXAMPLE 87

Into 1.0 liter of an aqueous solution of cobalt sulfate and ferrous sulfate containing both 0.068 mol of Co and 0.143 mol of $Fe^{2+}$, 100 g of the spindle-like maghemite particles containing Si obtained in Example 27 were added and dispersed, while preventing the intermingling of air therein as possible, thereby obtaining an aqueous slurry of the thus dispersed particles. Then 96 ml of an aqueous 18-N NaOH solution were added to the aqueous dispersion, and water was further added to the thus obtained alkaline dispersion to make the total volume to 1.3 liters with a concentration of OH group of 1.0 mol/liter.

After heating the aqueous, alkaline dispersion to 100° C., the dispersion was stirred for 5 hours at the temperature. Then the dispersion was filtered to obtain a precipitate, which was washed with water, dried at 60° C. to obtain the spindle-like maghemite particles containing Si coated by cobalt.

As a result of electron microscopic observation of the thus obtained particles, it was found that the particles inherited the shape and the particle size of the precursor (the spindle-like maghemite particles containing Si) and showed the length of the major axis of 0.30 μm and an aspect ratio (major axis:minor axis) of 2.7:1. As the result of determination of magnetic properties thereof, the coercive force (Hc), saturation magnetization (os) and S.F.D. were 640 Oe, 76.5 emu/g and 1.5.

The content of Si and Co of the particles were 0.13 atomic % (calculated as Si) and 4.9 atomic % (calculated as Co), respectively to Fe therein.

EXAMPLES 88 to 93 and COMPARATIVE EXAMPLE 5

In the same manner as in Example 87 except for changing the precursor (the spindle-like maghemite particles containing Si), the amounts of addition of Co, $Fe^{2+}$ and aqueous solution of NaOH and the temperature and time of reaction, the spindle-like maghemite particles containing Si coated by Co or both Co and $Fe^{2+}$ as shown in Table 9 were obtained. The specific properties and the major conditions for producing the particles are also shown in Table 9.

Electron microscope photographs (×20000) of the spindle-like maghemite particles containing Si coated by Co and $Fe^{2+}$ obtained respectively in Examples 87, 88 and 91 are shown in FIGS. 32 to 34.

EXAMPLES 94 to 107 and COMPARATIVE EXAMPLES 6 and 7

Preparation of Magnetic Tapes

EXAMPLE 94

In the same manner as in Example 70, except for using the particles obtained in Example 80 instead of those obtained in Example 50, a magnetic tape was prepared which showed the coercive force (Hc) of 645 Oe, the residual magnetic flux density (Br) of 1150 Gauss, and squareness ratio (Br/Bm) of 0.60.

EXAMPLES 95 to 107 and COMPARATIVE EXAMPLES 6 and 7

In the same manner as in Example 94 except for changing the magnetic particles as shown in Table 10, magnetic tapes were prepared. The specific properties of the thus prepared magnetic tapes are also shown in Table 10.

TABLE 1

| Examples and Comparative Example | Formation of FeCO₃ | | | | | | | | | pH | Temp. (°C.) | Specific Properties of Spindle-like goethite Particles | | | | |
|---|---|---|---|---|---|---|---|---|---|---|---|---|---|---|---|---|
| | Ferrous salt | Alkali Carbonate | | | Water-soluble Silicate | | | | Other Metal ion | | | | | Content of Si to Fe (Atomic %) | Content of other Metal to Fe (Atomic %) | Major axis (μm) | Aspect ratio (major: minor) | Apparent density (g/cc) |
| | | Kind | Conc. (mol/l) | Kind | Amount of addition of Si to Fe(Atomic %) | Time of addition* | Kind | Content of other Metal to Fe (Atomic %) | | | | | | | |
| Ex. 1 | FeSO₄ | Na₂CO₃ | 3.53 | sodium silicate | 0.15 | B | — | — | 9.9 | 50 | 0.14 | — | 0.43 | 3:1 | 0.39 |
| Ex. 2 | FeSO₄ | K₂CO₃ | 3.53 | sodium silicate | 0.35 | B | — | — | 9.8 | 50 | 0.36 | — | 0.26 | 2:1 | 0.43 |
| Ex. 3 | FeSO₄ | Na₂CO₃ | 3.53 | sodium silicate | 1.00 | B | — | — | 9.8 | 50 | 1.02 | — | 0.23 | 1.5:1 | 0.45 |
| Ex. 4 | FeSO₄ | (NH₄)₂CO₃ | 3.53 | sodium silicate | 3.00 | B | — | — | 9.9 | 70 | 3.00 | — | 0.25 | 2:1 | 0.47 |
| Ex. 5 | FeSO₄ | (NH₄)₂CO₃ | 3.53 | potassium silicate | 6.00 | B | — | — | 10.1 | 50 | 6.02 | — | 0.17 | 1:1 | 0.51 |
| Ex. 6 | FeCl₂ | (NH₄)₂CO₃ | 3.53 | sodium silicate | 9.00 | B | — | — | 10.1 | 50 | 8.97 | — | 0.15 | 1:1 | 0.53 |
| Ex. 7 | FeSO₄ | (NH₄)₂CO₃ | 3.53 | sodium silicate | 11.00 | B | — | — | 10.3 | 60 | 11.01 | — | 0.16 | 1.3:1 | 0.56 |
| Ex. 8 | FeSO₄ | (NH₄)₂CO₃ | 3.53 | sodium silicate | 1.00 | A | — | — | 9.9 | 60 | 1.02 | — | 0.24 | 1.5:1 | 0.44 |
| Ex. 9 | FeSO₄ | (NH₄)₂CO₃ | 3.53 | sodium silicate | 1.00 | C | — | — | 9.8 | 60 | 1.02 | — | 0.23 | 1.5:1 | 0.44 |
| Ex. 10 | FeSO₄ | (NH₄)₂CO₃ | 3.61 | sodium silicate | 1.00 | B | CoSO₄ | 5.0 | 9.8 | 60 | 1.01 | 4.99 | 0.24 | 1.5:1 | 0.43 |
| Ex. 11 | FeSO₄ | (NH₄)₂CO₃ | 3.55 | sodium silicate | 1.00 | B | ZnSO₄ | 1.0 | 9.8 | 60 | 1.03 | 1.02 | 0.22 | 1.5:1 | 0.45 |
| Ex. 12 | FeSO₄ | (NH₄)₂CO₃ | 3.55 | sodium silicate | 1.00 | B | NiSO₄ | 1.0 | 9.9 | 60 | 1.01 | 0.99 | 0.22 | 1.5:1 | 0.44 |
| Comp. Ex.1 | FeSO₄ | Na₂CO₃ | 3.53 | — | — | — | — | — | 9.8 | 50 | — | — | 0.55 | 7:1 | 0.33 |

Notes
*Time of addition:
A: added to the aqueous solution of the ferrous salt
B: added to the alkali carbonate
C: added to the aqueous suspension containing FeCO₃.

TABLE 2

| Examples and Comparative Example | Spindle-like Goethite Particles (Example Nos. and Comparative Example No.) | Reduction Temperature | Spindle-like Magnetite Particles | | | | | |
|---|---|---|---|---|---|---|---|---|
| | | | Particle Properties | | | | Magnetic Properties | |
| | | | Content of Si to Fe (Atomic %) | Content of Other Metal to Fe (Atomic %) | Major Axis ($\mu$m) | Aspect Ratio (major:minor) | Coercive Force (Hc) (Oe) | Saturation Magnetization ($\sigma_s$) (emu/g) |
| Example 14 | Example 1 | 400 | 0.13 | — | 0.30 | 2.7:1 | 296 | 83.6 |
| 15 | 2 | 400 | 0.35 | — | 0.22 | 1.8:1 | 270 | 83.2 |
| 16 | 3 | 400 | 1.00 | — | 0.20 | 1.3:1 | 239 | 82.7 |
| 17 | 4 | 400 | 3.01 | — | 0.21 | 1.1:1 | 220 | 81.0 |
| 18 | 5 | 300 | 5.99 | — | 0.15 | 1:1 | 209 | 79.6 |
| 19 | 6 | 300 | 8.97 | — | 0.13 | 1:1 | 190 | 77.3 |
| 20 | 7 | 300 | 10.99 | — | 0.14 | 1.2:1 | 188 | 75.8 |
| 21 | 8 | 350 | 1.01 | — | 0.20 | 1.3:1 | 237 | 82.4 |
| 22 | 9 | 350 | 1.00 | — | 0.20 | 1.3:1 | 241 | 82.4 |
| 23 | 10 | 450 | 0.99 | Co: 4.99 | 0.19 | 1.2:1 | 521 | 79.6 |
| 24 | 11 | 450 | 1.01 | Zn: 1.00 | 0.18 | 1.3:1 | 265 | 80.7 |
| 25 | 12 | 450 | 0.99 | Ni: 0.96 | 0.18 | 1.3:1 | 260 | 80.8 |
| 26 | 13 | 400 | 0.35 | — | 0.21 | 1.8:1 | 275 | 83.5 |
| Comparative Example 2 | Comparative Example 1 | 350 | — | — | 0.50 | 6:1 | 320 | 84.0 |

TABLE 3

| Examples and Comparative Example | Spindle-like Magnetite Particles (Example Nos. and Comparative Example No.) | Spindle-like Maghemite Particles | | | | | |
|---|---|---|---|---|---|---|---|
| | | Particle Properties | | | | Magnetic Properties | |
| | | Content of Si to Fe (Atomic %) | Content of Other Metal to Fe (Atomic %) | Major Axis ($\mu$m) | Aspect Ratio (major:minor) | Coercive Force (Hc) (Oe) | Saturation Magnetization ($\sigma_s$) (emu/g) |
| Example 27 | Example 14 | 0.14 | — | 0.30 | 2.7:1 | 278 | 73.5 |
| 28 | 15 | 0.35 | — | 0.22 | 1.8:1 | 253 | 73.3 |
| 29 | 16 | 0.99 | — | 0.20 | 1.3:1 | 224 | 72.7 |
| 30 | 17 | 2.98 | — | 0.21 | 1.1:1 | 205 | 71.3 |
| 31 | 18 | 6.00 | — | 0.15 | 1:1 | 194 | 69.9 |
| 32 | 19 | 8.97 | — | 0.13 | 1:1 | 186 | 67.5 |
| 33 | 20 | 10.99 | — | 0.14 | 1.2:1 | 179 | 65.2 |
| 34 | 21 | 1.00 | — | 0.20 | 1.3:1 | 222 | 72.5 |
| 35 | 22 | 1.00 | — | 0.20 | 1.3:1 | 223 | 72.4 |
| 36 | 23 | 0.98 | Co: 4.97 | 0.19 | 1.2:1 | 496 | 69.2 |
| 37 | 24 | 1.01 | Zn: 0.98 | 0.18 | 1.3:1 | 247 | 70.6 |
| 38 | 25 | 0.99 | Ni: 0.96 | 0.18 | 1.3:1 | 242 | 70.7 |
| 39 | 26 | 0.35 | — | 0.21 | 1.8:1 | 260 | 73.0 |
| Comparative Example 3 | Comparative Example 2 | — | — | 0.5 | 6:1 | 298 | 74.1 |

TABLE 4

| | | | Formation of FeCO₃ | | | | | | | | | Spindle-like Goethite Particles Particle Properties | | | |
|---|---|---|---|---|---|---|---|---|---|---|---|---|---|---|---|
| | Ferrous Salt | Alkali Carbonate | | Water-soluble Silicate | | | Water-soluble Cobalt-Salt | | | | | | | | |
| Examples | Kind | Kind | Conc. (mol/l) | Kind | Amount of addition of Si to Fe (Atomic %) | Time of Addition* | Kind | Amount of addition of Co to Fe (Atomic %) | Time of Addition* | pH | Temp. (°C) | Content of Si to Fe (Atomic %) | Content of Co to Fe (Atomic %) | Major Axis (μm) | Aspect Ratio (major: minor) |
| 40 | FeSO₄ | Na₂CO₃ | 3.53 | sodium silicate | 0.4 | B | CoSO₄ | 4.0 | B | 9.9 | 50 | 0.41 | 3.99 | 0.17 | 1.5:1 |
| 41 | FeSO₄ | Na₂CO₃ | 3.53 | sodium silicate | 6.0 | B | CoSO₄ | 4.0 | B | 9.8 | 50 | 6.02 | 3.98 | 0.15 | 1.3:1 |
| 42 | FeSO₄ | Na₂CO₃ | 3.53 | sodium silicate | 11.0 | B | CoSO₄ | 4.0 | B | 9.8 | 50 | 10.98 | 3.98 | 0.14 | 1:1 |
| 43 | FeSO₄ | Na₂CO₃ | 3.53 | sodium silicate | 0.4 | B | CoSO₄ | 1.0 | B | 9.9 | 70 | 0.39 | 1.01 | 0.30 | 2.8:1 |
| 44 | FeSO₄ | Na₂CO₃ | 3.53 | sodium silicate | 0.4 | B | CoSO₄ | 2.0 | B | 10.1 | 50 | 0.38 | 1.98 | 0.18 | 1.7:1 |
| 45 | FeSO₄ | Na₂CO₃ | 3.53 | sodium silicate | 10.0 | B | CoSO₄ | 5.0 | B | 10.1 | 50 | 9.97 | 4.98 | 0.13 | 1:1 |
| 46 | FeSO₄ | Na₂CO₃ | 3.53 | sodium silicate | 13.0 | B | CoSO₄ | 8.0 | B | 10.3 | 50 | 12.98 | 7.99 | 0.14 | 1:1 |
| 47 | FeSO₄ | Na₂CO₃ | 3.53 | potassium silicate | 2.0 | A | CoSO₄ | 4.0 | A | 9.9 | 50 | 2.01 | 3.99 | 0.19 | 1.3:1 |
| 48 | FeCl₂ | (NH₄)₂CO₃ | 3.53 | sodium silicate | 2.0 | C | CoSO₄ | 4.0 | C | 9.8 | 50 | 1.98 | 4.01 | 0.20 | 1.5:1 |

Notes
*Time of addition:
A: added to the aqueous solution of the ferrous salt
B: added to the alkali carbonate
C: added to the aqueous suspension containing FeCO₃.

TABLE 5

| | Spindle-like Goethite Particles (Example Nos.) | Reduction temperature (°C.) | Spindle-like Magnetite Particles | | | | | | |
|---|---|---|---|---|---|---|---|---|---|
| | | | Particle Properties | | | | Magnetic Properties | | |
| Examples | | | Content of Si to Fe (Atomic %) | Content of Co to Fe (Atomic %) | Major Axis (μm) | Aspect Ratio (major: minor) | Coercive Force (Hc) (Oe) | Saturation Magnetization ($\sigma_s$) (emu/g) | Stability to temperature ($\Delta Hc$) (Oe) |
| Example 50 | Example 40 | 400 | 0.40 | 3.98 | 0.15 | 1.5:1 | 615 | 83.2 | 180 |
| 51 | 41 | 400 | 6.00 | 3.98 | 0.14 | 1.3:1 | 538 | 78.4 | 130 |
| 52 | 42 | 400 | 10.97 | 3.97 | 0.13 | 1:1 | 455 | 77.0 | 95 |
| 53 | 43 | 350 | 0.38 | 0.99 | 0.35 | 2.6:1 | 340 | 82.3 | 85 |
| 54 | 44 | 350 | 0.39 | 1.98 | 0.16 | 1.6:1 | 368 | 83.5 | 100 |
| 55 | 45 | 350 | 9.96 | 4.97 | 0.12 | 1:1 | 580 | 72.5 | 145 |
| 56 | 46 | 350 | 12.99 | 7.98 | 0.13 | 1:1 | 814 | 71.3 | 210 |
| 57 | 47 | 350 | 1.99 | 3.97 | 0.16 | 1.2:1 | 600 | 81.9 | 190 |
| 58 | 48 | 350 | 2.00 | 3.99 | 0.18 | 1.4:1 | 591 | 82.4 | 187 |
| 59 | 49 | 350 | 6.03 | 3.99 | 0.15 | 1.3:1 | 555 | 80.5 | 178 |

TABLE 6

| | Spindle-like Magnetite Particles (Example Nos.) | Spindle-like Maghemite Particles | | | | | | |
|---|---|---|---|---|---|---|---|---|
| | | Particle Properties | | | | Magnetic Properties | | |
| Examples | | Content of Si to Fe (Atomic %) | Content of Co to Fe (Atomic %) | Major Axis (μm) | Aspect Ratio (major: minor) | Coercive Force (Hc) (Oe) | Saturation Magnetization ($\sigma_s$) (emu/g) | Thermo-stability ($\Delta Hc$) (Oe) |
| Example 60 | Example 50 | 0.40 | 3.98 | 0.15 | 1.5:1 | 610 | 73.0 | 170 |
| 61 | 51 | 6.01 | 3.97 | 0.14 | 1.3:1 | 540 | 69.5 | 125 |
| 62 | 52 | 10.98 | 3.97 | 0.13 | 1:1 | 450 | 65.0 | 100 |
| 63 | 53 | 0.39 | 0.97 | 0.30 | 2.6:1 | 310 | 73.5 | 80 |
| 64 | 54 | 0.37 | 1.98 | 0.16 | 1.6:1 | 345 | 73.3 | 95 |
| 65 | 55 | 9.98 | 4.98 | 0.12 | 1:1 | 600 | 64.5 | 140 |
| 66 | 56 | 12.99 | 7.98 | 0.13 | 1:1 | 885 | 63.4 | 220 |
| 67 | 57 | 1.98 | 3.98 | 0.16 | 1.2:1 | 607 | 72.5 | 165 |
| 68 | 58 | 1.98 | 4.00 | 0.18 | 1.3:1 | 600 | 72.8 | 173 |
| 69 | 59 | 6.00 | 3.97 | 0.15 | 1.3:1 | 550 | 69.8 | 150 |

TABLE 7

| | Magnetic iron oxide Particles (Example Nos.) | Properties of Magnetic Tape | | | |
|---|---|---|---|---|---|
| Examples | | Coercive Force (Hc) (Oe) | Residual Magnetic Flux Density (Br) (Gauss) | Squareness Ratio (Br/Bm) | Orientation Ratio (Br/Bm)// (Br/Bm)⊥ |
| 70 | 50 | 621 | 1450 | 0.75 | 1.00 |
| 71 | 51 | 550 | 1380 | 0.73 | 0.99 |
| 72 | 52 | 460 | 1350 | 0.71 | 1.00 |
| 73 | 53 | 348 | 1450 | 0.69 | 0.99 |
| 74 | 54 | 380 | 1460 | 0.69 | 0.99 |
| 75 | 65 | 610 | 1100 | 0.75 | 0.99 |
| 76 | 66 | 900 | 1090 | 0.79 | 1.00 |
| 77 | 67 | 620 | 1290 | 0.75 | 0.99 |
| 78 | 68 | 608 | 1300 | 0.75 | 0.99 |
| 79 | 69 | 565 | 1250 | 0.73 | 1.00 |

TABLE 8

| | | Preparation of Spindle-like Magnetite Particles coated by Co or Co and $Fe^{2+}$ | | | | Spindle-like Magnetite Particles coated by Co or Co and $Fe^{2+}$ | | | | Magnetic Properties | | |
|---|---|---|---|---|---|---|---|---|---|---|---|---|
| | Precursor (Example Nos. and Comparative Example No.) | Amount of Addition of Co (mol) | Amount of Addition of $Fe^{2+}$ (mol) | Amount of Addition of NaOH (ml) | Temp. (°C) | | Particle Properties | | | | | |
| Examples and Comparative Example | | | | | | Content of Si to Fe (Atomic %) | Content of Co to Fe (Atomic %) | Major axis (μm) | Aspect ratio (major: minor) | Coercive Force (Hc) (Oe) | Saturation Magnetization ($\sigma_s$) (emu/g) | S.F.D. |
| Example 80 | Example 18 | 0.085 | 0.179 | 102 | 100 | 5.20 | 5.9 | 0.15 | 1:1 | 654 | 85.8 | 1.1 |
| 81 | 16 | 0.136 | 0.215 | 111 | 50 | 0.86 | 8.9 | 0.20 | 1.3:1 | 630 | 84.0 | 1.4 |
| 82 | 14 | 0.068 | 0.215 | 104 | 100 | 0.11 | 4.5 | 0.30 | 2.7:1 | 650 | 87.6 | 1.5 |
| 83 | 20 | 0.102 | 0.215 | 180 | 80 | 9.30 | 7.1 | 0.14 | 1.2:1 | 630 | 80.5 | 1.1 |
| 84 | 22 | 0.085 | 0.179 | 174 | 100 | 0.87 | 5.8 | 0.20 | 1.3:1 | 640 | 87.0 | 1.1 |
| 85 | 24 | 0.136 | — | 232 | 100 | 0.99 | 10.5 | 0.18 | 1.3:1 | 610 | 79.5 | 1.4 |
| 86 | 26 | 0.102 | 0.215 | 107 | 100 | 0.30 | 6.8 | 0.21 | 1.8:1 | 710 | 88.8 | 1.5 |
| Comparative Example 4 | Comparative Example 2 | 0.085 | 0.179 | 102 | 100 | 0.01 | 5.8 | 0.50 | 6:1 | 680 | 87.5 | 2.0 |

TABLE 9

| | | Preparation of Spindle-like Magnetite Particles coated by Co or Co and Fe$^{2+}$ | | | | Spindle-like Maghemite Particles coated by Co or Co and Fe$^{2+}$ | | | | | | |
|---|---|---|---|---|---|---|---|---|---|---|---|---|
| | | | | | | Particle Properties | | | | Magnetic Properties | | |
| Examples and Comparative Example | Precursor (Example Nos. and Comparative Example No.) | Amount of Addition of Co (mol) | Amount of Addition of Fe$^{2+}$ (mol) | Amount of Addition of NaOH (ml) | Temp. (°C.) | Content of Si to Fe (Atomic %) | Content of Co to Fe (Atomic %) | Major axis (μm) | Aspect ratio (major: minor) | Coercive Force (Hc) (Oe) | Saturation Magnetization ($\sigma_s$) (emu/g) | S.F.D. |
| Example 87 | Example 27 | 0.068 | 0.143 | 96 | 100 | 0.13 | 4.9 | 0.30 | 2.7:1 | 640 | 76.5 | 1.5 |
| 88 | 28 | 0.085 | 0.179 | 102 | 100 | 0.30 | 5.9 | 0.22 | 1.8:1 | 650 | 77.5 | 1.4 |
| 89 | 30 | 0.102 | 0.215 | 107 | 60 | 2.50 | 7.0 | 0.21 | 1.1:1 | 550 | 73.5 | 1.2 |
| 90 | 32 | 0.119 | 0.179 | 105 | 80 | 7.70 | 8.7 | 0.13 | 1:1 | 600 | 73.8 | 1.1 |
| 91 | 34 | 0.068 | 0.143 | 168 | 100 | 0.98 | 4.9 | 0.20 | 1.3:1 | 610 | 76.0 | 1.3 |
| 92 | 36 | 0.068 | 0.143 | 168 | 100 | 0.87 | 9.5 | 0.19 | 1.2:1 | 760 | 76.2 | 1.3 |
| 93 | 38 | 0.153 | — | 234 | 100 | 0.98 | 12.2 | 0.18 | 1.3:1 | 595 | 69.9 | 1.3 |
| Comparative Example 5 | Comparative Example 3 | 0.085 | 0.179 | 102 | 100 | 0.01 | 5.9 | 0.50 | 6:1 | 670 | 77.3 | 1.9 |

TABLE 10

| Examples and Comparative Examples | Magnetic iron oxide Particles (Example Nos. and Comparative Example Nos.) | Properties of Magnetic Tape | | |
|---|---|---|---|---|
| | | S.F.D | Squareness Ratio (Br/Bm) | Coercive Force (Hc) (Oe) | Residual Magnetic Flux Density (Br) (Gauss) |
| Example 94 | Example 80 | 0.95 | 0.60 | 645 | 1150 |
| 95 | 81 | 0.90 | 0.59 | 610 | 1110 |
| 96 | 82 | 0.65 | 0.59 | 640 | 1130 |
| 97 | 83 | 0.60 | 0.59 | 620 | 1100 |
| 98 | 84 | 0.70 | 0.59 | 635 | 1150 |
| 99 | 85 | 0.90 | 0.60 | 650 | 1090 |
| 100 | 86 | 0.95 | 0.62 | 695 | 1140 |
| 101 | 87 | 0.85 | 0.59 | 635 | 1080 |
| 102 | 88 | 0.80 | 0.59 | 630 | 1100 |
| 103 | 89 | 0.70 | 0.56 | 545 | 1030 |
| 104 | 90 | 0.60 | 0.57 | 595 | 1050 |
| 105 | 91 | 0.65 | 0.58 | 600 | 1070 |
| 106 | 92 | 0.70 | 0.71 | 745 | 1070 |
| 107 | 93 | 0.75 | 0.57 | 590 | 1000 |
| Comparative Example 6 | Comparative Example 4 | 1.15 | 0.57 | 660 | 1100 |
| 7 | 5 | 1.20 | 0.56 | 660 | 980 |

What is claimed is:

1. Magnetic iron oxide particles suitable for magnetic recording comprising spindle-shaped magnetite particles having substantially uniform particle shapes and being substantially free of dendrites, said magnetic particles having an aspect ratio (major axis:minor axis) of less than 4:1 and containing 0.1 to 20 atomic % of Si to Fe.

2. Magnetic iron oxide particles according to claim 1, wherein the spindle-shaped magnetite particles have an aspect ratio (major axis:minor axis) of less than 2:1 and contain 0.3 to 15 atomic % of Si to Fe.

3. Magnetic iron oxide particles according to claim 1 or 2, wherein the spindle-shaped magnetite particles further contain 0.5 to 10.0 atomic % of Co to Fe.

4. Magnetic iron oxide particles according to claim 2, wherein the surface of the spindle-shaped magnetite particles is coated by 0.5 to 15 atomic % of Co to Fe and the spindle-shaped magnetite particles have a range of distribution of the coercive force of less than 1.4 in S.F.D.

5. Magnetic iron oxide particles suitable for magnetic recording comprising spindle-shaped maghemite particles having substantially uniform particle shapes and being substantially free of dendrites, saimaghemite particles having an aspect ratio (major axis:minor axis) of less than 4:1 and containing 0.1 to 20 atomic % of Si to Fe.

6. Magnetic iron oxide particles according to claim 5, wherein the spindle-shaped maghemite particles have an aspect ratio (major axis:minor axis) of less than 2:1 and contain 0.3 to 15 atomic % of Si and Fe.

7. Magnetic iron oxide particles according to claim 5 or 6, wherein the spindle-shaped maghemite particles further contain 0.5 to 10.0 atomic % of Co to Fe.

8. Magnetic iron oxide particles according to claim 6, wherein the surface of the spindle-shaped maghemite particles is coated by 0.5 to 15 atomic % of Co to Fe and the spindle-shaped maghemite particles have a range of distribution of the coercive force of less than 1.4 in S.F.D.

9. A process for producing magnetic iron oxide particles suitable for magnetic recording, comprising spindle-shaped magnetite particles having substantially uniform particle shapes, and being substantially free of dendrites, which comprises:

(a) oxidizing $FeCO_3$ in an aqueous suspension by blowing an oxygen-containing gas into the aqueous suspension containing $FeCO_3$ obtained by reacting an aqueous solution of a ferrous salt with an aqueous solution of alkali carbonate, wherein a water-soluble silicate is added into said aqueous solution of alkali carbonate, into the aqueous solution of a ferrous salt or into the aqueous suspension containing $FeCO_3$ before blowing the oxygen-containing gas thereinto in an amount of 0.1 to 20 atomic % (calculated as Si) to Fe (of the ferrous salt), thereby obtaining spindle-shaped goethite particles containing Si, and (b) subjecting the thus obtained spindle-shaped goethite particles containing Si or the spindle-shaped hematite particles containing Si obtained by thermally dehydrating the spindle-shaped goethite particles containing Si to thermal reduction in a reducing gas.

10. A process according to claim 9, wherein said water-soluble silicate is added in an amount of 0.3 to 15 atomic % (calculated as Si) to Fe of the ferrous salt.

11. A process according to claim 9 or 10, wherein a water-soluble cobalt salt is further added into the aqueous solution of alkali carbonate, into the aqueous solution of a ferrous salt or into the aqueous suspension containing $FeCO_3$ before blowing the oxygen-containing gas thereinto in an amount of 0.5 to 10.0 atomic % (calculated as Co) to Fe of the ferrous salt.

12. A process according to claim 9 or 10, wherein said spindle-like magnetite particles are dispersed in an aqueous alkaline suspension of cobalt hydroxide or both cobalt hydroxide and ferrous hydroxide and the resultant aqueous suspension is subjected to thermal treatment at 50° to 100° C. in a non-oxidative atmosphere, thereby obtaining the spindle-like magnetite particles whose the surface is coated by 0.5 to 15 atomic % of Co to Fe.

13. A process for producing magnetic iron oxide particles suitable for magnetic recording comprising spindle-shaped maghemite particles, having substantially uniform particle shapes, and being substantially free of dendrites, which comprises:

(a) oxidizing $FeCO_3$ in an aqueous suspension by blowing an oxygen-containing gas into the aqueous suspension containing $FeCO_3$ obtained by reacting an aqueous solution of a ferrous salt with an aqueous solution of alkali carbonate, wherein a water-soluble silicate is added into said aqueous solution of alkali carbonate, into the aqueous solution of a ferrous salt or into the aqueous suspension containing $FeCO_3$ before blowing the oxygen-containing gas thereinto in an amount of 0.1 to 20 atomic % (calculated as Si) to Fe (of the ferrous salt), thereby obtaining spindle-shaped goethite particles containing Si, and (b) subjecting the thus obtained spindle-shaped goethite particles containing Si or the spindle-shaped hematite particles containing Si obtained by thermally dehydrating the spindle-shaped goethite particles containing Si to thermal reduction in a reducing gas, and oxidizing the thus obtained spindle-shaped magnetite particles.

14. A process according to claim 13, wherein said water-soluble silicate is added in an amount of 0.3 to 15 atomic % (calculated as Si) to Fe of the ferrous salt.

15. A process according to claim 13 or 14, wherein a water-soluble cobalt salt is further added into the aqueous solution of alkali carbonate, into the aqueous solution of a ferrous salt or into the aqueous suspension containing $FeCO_3$ before blowing the oxygen-containing gas thereinto in an amount of 0.5 to 10.0 atomic % (calculated as Co) to Fe of the ferrous salt.

16. A process according to claim 13 or 14, wherein said spindle-shaped maghemite particles are dispersed in an aqueous alkaline suspension of cobalt hydroxide or both cobalt hydroxide and ferrous hydroxide and the resultant aqueous suspension is subjected to thermal treatment at 50° to 100° C. in a non-oxidative atmosphere, thereby obtaining the spindle-like maghemite particles whose the surface is coated by 0.5 to 15 atomic % of Co to Fe.

17. Magnetic iron oxide particles suitable for magnetic recording, comprising spindle-shaped maghemite particles having substantially uniform particle shapes, and being substantially free of dendrites, having an aspect ratio (major axis:minor axis) of less than 4:1 and a distribution of coercive force of less than 1.5 in S.F.D, and containing 0.1 to 20 atomic % of Si to Fe, wherein the surface of the spindle-shaped maghemite is coated with 0.5 to 15 atomic % of Co to Fe.

18. Magnetic iron oxide particles according to claim 17, having an aspect ratio of less than 2:1.

19. Magnetic iron oxide particles suitable for magnetic recording, comprising spindle-shaped maghemite particles having substantially uniform particle shapes, and being substantially free of dendrites, having an aspect ratio (major axis:minor axis) of less than 4:1 and a distribution of coercive force of less than 1.5 in S.F.D, and containing 0.1 to 20 atomic % of Si to Fe, and wherein the surface of the spindle-shaped magnetite particles is coated with 0.5 to 15 atomic % of Co to Fe.

20. Magnetic iron oxide particles according to claim 19, having an aspect ratio of less than 2:1.

* * * * *

UNITED STATES PATENT AND TRADEMARK OFFICE
CERTIFICATE OF CORRECTION

PATENT NO. : 4,873,010

DATED : OCTOBER 10, 1989

INVENTOR(S) : Atsushi TAKEDOI et al

It is certified that error appears in the above-identified patent and that said Letters Patent is hereby corrected as shown below:

```
Column 37, line 47, change "saimaghemite" to
                    -- said maghemite --.

Column 37, line 54, change "Si and Fe" to -- Si to Fe --.

Column 40, line 20, change "maghemite" to -- magnetite --.
```

Signed and Sealed this

Twenty-first Day of April, 1992

Attest:

HARRY F. MANBECK, JR.

*Attesting Officer*  *Commissioner of Patents and Trademarks*